(12) United States Patent
Lewis

(10) Patent No.: US 10,413,776 B2
(45) Date of Patent: Sep. 17, 2019

(54) EXERCISE DEVICE

(71) Applicants: Jeremy Simon Lewis, County Down, Northern Ireland (GB); Edward Ronald Lennon, County Down, Northern Ireland (GB)

(72) Inventor: Jeremy Simon Lewis, County Down, Northern Ireland (GB)

(*) Notice: Subject to any disclaimer, the term of this patent is extended or adjusted under 35 U.S.C. 154(b) by 344 days.

(21) Appl. No.: 15/355,705

(22) Filed: Nov. 18, 2016

(65) Prior Publication Data

US 2017/0136286 A1     May 18, 2017

(30) Foreign Application Priority Data

Nov. 18, 2015 (GB) .................................. 1520318.5
Apr. 15, 2016 (GB) .................................. 1606620.1

(51) Int. Cl.
    *A63B 21/02*     (2006.01)
    *A63B 21/00*     (2006.01)
    (Continued)

(52) U.S. Cl.
    CPC .... *A63B 21/4049* (2015.10); *A63B 21/00069* (2013.01); *A63B 21/023* (2013.01); *A63B 21/045* (2013.01); *A63B 21/072* (2013.01); *A63B 21/0724* (2013.01); *A63B 21/0728* (2013.01); *A63B 21/22* (2013.01); *A63B 21/4035* (2015.10); *A63B 23/03525* (2013.01);
(Continued)

(58) Field of Classification Search
CPC ........ A63B 21/00065; A63B 21/00069; A63B 21/023; A63B 21/045; A63B 21/072; A63B 21/0724; A63B 21/0728; A63B 21/22; A63B 21/4035; A63B 21/4049; A63B 21/23; A63B 21/03508; A63B 21/03525; A63B 21/1245; A63B 21/1281; A63B 21/14; A63B 2071/0694; A63B 2208/0204; A63B 2208/0233; F16B 7/1454

See application file for complete search history.

(56) References Cited

U.S. PATENT DOCUMENTS 3,802,701 A * 4/1974 Good, Jr. ............. A63B 21/015
    482/119
3,830,493 A * 8/1974 Miller .................... A63B 23/14
    482/46

(Continued)

*Primary Examiner* — Joshua Lee
(74) *Attorney, Agent, or Firm* — LaMorte & Associates P.C.

(57) ABSTRACT

The present invention provides an exercise device for use in non-surgical treatment of tennis elbow or lateral epicondylopathy (LE) and for post-surgical rehabilitation and other upper limb rehabilitation. The exercise device comprising a main body, and at least one gripping means provided on the main body, wherein each gripping means comprises a rotatable hand grip and a mode selector means, wherein the mode selector means is operable to move the gripping means from a first configuration in which the rotatable hand grip is rotatable relative the main body and a second configuration in which the rotatable hand grip is in a fixed position and not rotatable relative the main body, and wherein a static grip is provided on the main body such that a user may hold the exercise device with both hands, one hand holding the rotatable hand grip, the other hand holding the static grip to perform exercises.

19 Claims, 31 Drawing Sheets

(51) Int. Cl.
   *A63B 21/045* (2006.01)
   *A63B 21/072* (2006.01)
   *A63B 21/22* (2006.01)
   *A63B 23/12* (2006.01)
   *A63B 23/035* (2006.01)
   *A63B 23/14* (2006.01)
   *F16B 7/14* (2006.01)
   *A63B 71/06* (2006.01)

(52) U.S. Cl.
   CPC ...... *A63B 23/1245* (2013.01); *A63B 23/1281* (2013.01); *A63B 23/14* (2013.01); *A63B 21/00065* (2013.01); *A63B 23/03508* (2013.01); *A63B 2071/0694* (2013.01); *A63B 2208/0204* (2013.01); *A63B 2208/0233* (2013.01); *F16B 7/1454* (2013.01)

(56) References Cited

U.S. PATENT DOCUMENTS

| | | | | |
|---|---|---|---|---|
| 4,043,553 A * | 8/1977 | Suarez | ............... | A63B 21/0608 482/106 |
| 4,203,591 A * | 5/1980 | Gibson | ............... | A63B 21/012 482/46 |
| 4,379,552 A * | 4/1983 | Webb | ................. | A63B 21/015 482/118 |
| 4,838,542 A * | 6/1989 | Wilkinson | ........... | A63B 21/075 482/108 |
| 5,167,596 A * | 12/1992 | Ferber | ............... | A63B 21/0004 482/114 |
| 5,445,581 A * | 8/1995 | Ferber | ................. | A63B 21/015 482/115 |
| 5,536,223 A | 7/1996 | Ferber | | |
| 5,776,034 A * | 7/1998 | Stamler | ............... | A63B 23/14 482/45 |
| 6,152,858 A * | 11/2000 | Kolb | ................... | A63B 23/14 482/100 |
| 6,676,570 B2 * | 1/2004 | Valentino | ............. | A61H 1/0285 482/114 |
| 6,773,378 B2 * | 8/2004 | Bastyr | ................ | A63B 21/0004 482/114 |
| 7,223,215 B2 * | 5/2007 | Bastyr | ................. | A63B 21/157 482/114 |
| 7,674,185 B2 * | 3/2010 | Omidi | .................. | A63B 15/00 473/219 |
| 9,750,970 B2 * | 9/2017 | Kennedy | ........... | A63B 21/4049 |
| 10,029,142 B2 * | 7/2018 | Koenig | ................ | A63B 21/075 |
| 2010/0029447 A1 * | 2/2010 | Song | ..................... | A63B 21/06 482/93 |
| 2010/0029450 A1 * | 2/2010 | Ward | ..................... | A63B 21/05 482/128 |
| 2012/0316012 A1 * | 12/2012 | Thackeray | ............ | A63B 15/00 473/457 |
| 2013/0172155 A1 * | 7/2013 | Adamchick | ........ | A63B 71/0622 482/8 |
| 2013/0331234 A1 * | 12/2013 | Niederman | ............ | A63B 23/14 482/46 |
| 2014/0221164 A1 * | 8/2014 | Siniora | ................ | A63B 21/015 482/46 |
| 2015/0251044 A1 | 9/2015 | Januszek | | |
| 2016/0067539 A1 * | 3/2016 | Carpinelli | .............. | A63B 23/16 482/49 |
| 2016/0184164 A1 * | 6/2016 | Browning | ........... | A63B 21/015 482/115 |

* cited by examiner

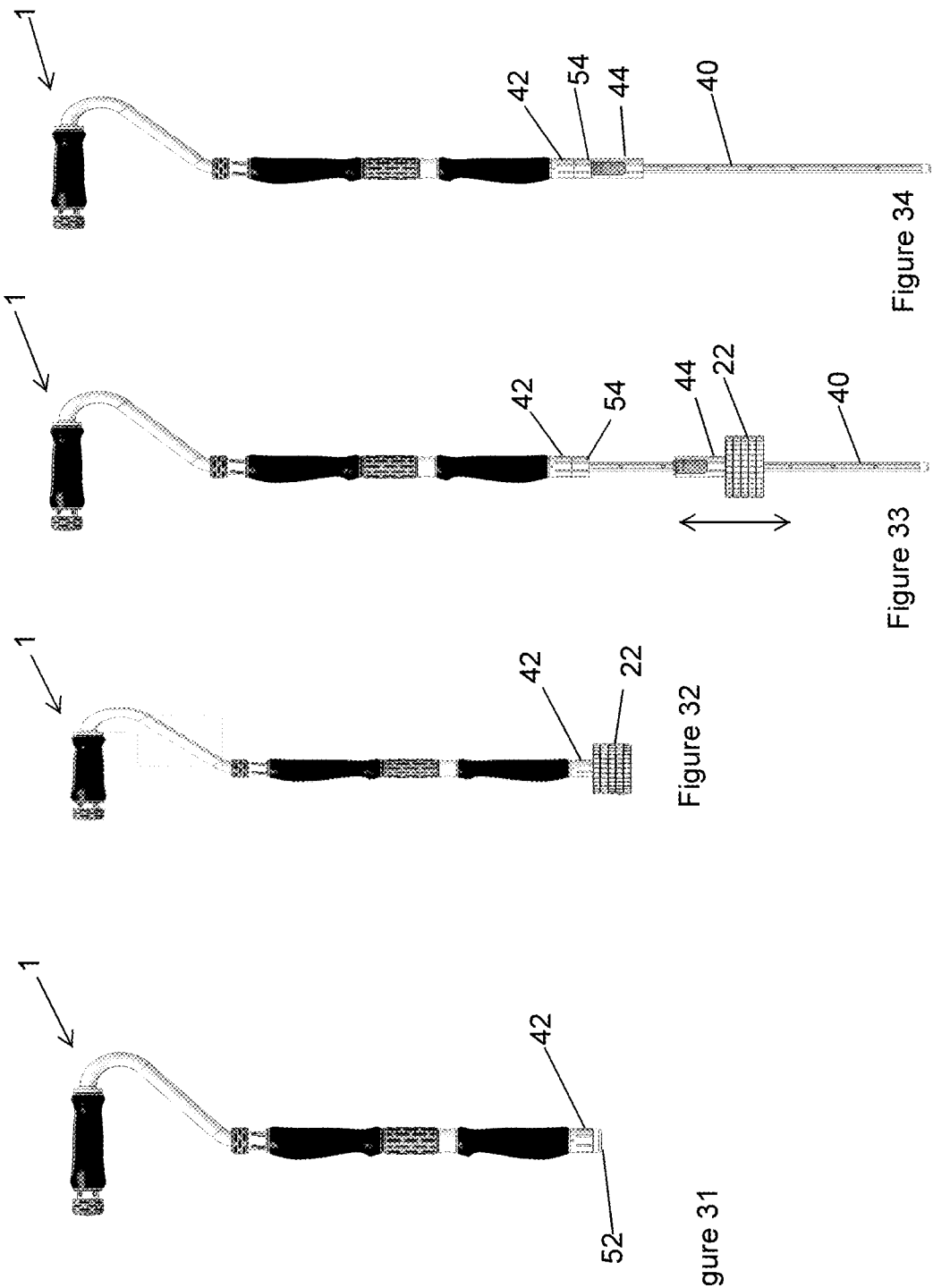

EXERCISE DEVICE

BACKGROUND OF THE INVENTION

1. Field of the Invention

The present invention relates to a handheld exercise device that can support weights at different distances from the hand.

2. Prior Art Description

Tennis elbow or lateral epicondylopathy (LE) is most commonly attributed to tendinopathy involving the extensor carpi radialis brevis (ECRB) tendon and is known to affect not only elite and recreational athletes, but also the general population.

The symptoms of LE include lateral elbow pain and weakness of the wrist and the preferred methods for treating LE are non-surgical, and include the use of analgesics, anti-inflammatory medications, taping or bracing of the affected areas, and exercise. Surgical treatment is typically only used when such non-surgical treatments are unsuccessful.

It is accordingly an object of the present invention to provide an improved exercise device for use in the non-surgical treatment of LE, for post-surgical rehabilitation and for other upper limb rehabilitation, and/or to provide the public and/or industry with a useful alternative exercise device.

According to the present invention, there is provided an exercise device comprising a main body, and at least one gripping means provided on the main body, wherein the or each gripping means comprises a rotatable hand grip and mode selector means, wherein the mode selector means is operable to move the gripping means from a first configuration in which the rotatable grip is rotatable relative to the main body and a second configuration in which the grip is in a fixed position and not rotatable relative to the main body, and further wherein a static or locked grip is provided on the main body such that a user may hold the exercise device with both hands, one hand holding the rotatable grip and the other hand holding the static grip to perform exercises.

The present invention provides an improved exercise device for use in the non-surgical treatment of LE. The device may also be used for post-surgical rehabilitation and for other upper limb rehabilitation.

Preferably, the exercise device further comprises tensioning means operable to impart a resistance on the rotatable grip as it is rotated in the first configuration.

Preferably, the tensioning means comprises a first compression spring positioned within the main body.

Preferably, the first compression spring compresses during rotation of the grip to provide resistance.

Preferably, the main body is a substantially hollow shaft operable to house the tensioning means.

Preferably, the mode selector means comprises an actuator coupled to the main body, the actuator operable to move the mode selector means to toggle the gripping means between the first configuration and the second configuration.

Preferably, the actuator is moved between a retracted and an advanced position relative to the main body to move the gripping means between the first configuration and the second configuration.

Preferably, the exercise device comprises a fixed radial collar connected to the main body and a locking sleeve connected to the rotatable grip, and whereby in the retracted position of the actuator the locking sleeve is disengaged from the radial collar allowing compression of the spring and rotation of the rotatable grip about the main body, and in the advanced position of the actuator the locking sleeve is engaged with the radial collar preventing rotation of the rotatable grip about the main body.

Preferably, in the first configuration the rotatable grip rotates between about 90 and 180 degrees relative to the main body.

Preferably, in the first configuration the rotatable grip rotates up to a maximum of one of: 100, 110, 120, 130, 140, 140, 160, 170 and 180 degrees or more relative to the main body.

Preferably, the mode selector means is further operable to move the gripping means to a third configuration in which the rotatable grip is rotatable under an adjustable resistance relative to the main body, and the exercise device further comprises resistance adjustment means operable to impart an adjustable resistance on the rotatable grip as it is rotated in the third configuration.

Preferably, the resistance adjustment means comprises a second compression spring operable between spaced apart first and second spring seats positioned within the main body, in which one or both of the first and the second spring seats is slideably movable within the main body to set a distance (i.e. increase and decrease the distance) between the spring seats to thereby adjust the length and so compression of the spring and set the tension or compression of the resistance adjustment means.

Preferably, the resistance adjustment means further comprises spring seat movement means to independently move the first spring seat within the main body to increase and decrease the distance between the first and the second spring seat to adjust the tension or compression of the second compression spring.

Preferably, the resistance adjustment means further comprises a tension or compression adjustment actuator operable to set the tension or compression of the second compression spring for the third configuration.

Preferably, the spring seat movement means comprises a spring sleeve connected to the first spring seat and the tension or compression adjustment actuator, and actuation of the tension or compression adjustment actuator moves the spring sleeve and the first spring seat linearly along the main body toward and away from the second spring seat to set the tension or compression of the spring for the third configuration.

Preferably, rotation of the grip is operable to move the second spring seat toward the first spring seat and compress the second compression spring.

Preferably, the adjustment actuator comprises a plurality of tension and/or compression settings.

Preferably, the main body comprises first and second elongate sections, in which the first elongate section is arranged at an angle of between 45 degrees and 135 degrees, and preferably, 90 degrees to the second elongate section.

Preferably, the first and second elongate sections are integrally formed.

Preferably, a rotatable hand grip operable between a first and second configuration is provided on the first elongate section, and a rotatable hand grip operable between first, second and third configurations and a locked hand grip are provided on the second elongate section of the exercise device.

Preferably, weights are operable to be attached to a free end of the exercise device.

Preferably, the exercise device further comprises a third elongate section which is operable to extend and retract telescopically from the second section, and the weights are operable to be attached to a free end of the third section.

Alternatively, the exercise device further comprises a third section having a connector means for optional attachment of one or more weights to the device.

Preferably, the exercise device further comprises an elongate shaft member which is operable to be releaseably attached to the connector means provided on the third section.

Preferably, weights are mounted to the elongate shaft member. Preferably, the weights comprise a through opening/bore enabling mounting to the elongate shaft member.

Preferably, the exercise device further comprises a weight mounting carriage which is operable to be positioned on the elongate shaft member.

Preferably, weights are connectable to the weight mounting carriage.

Preferably, the weight mounting carriage together with one or more weights connected thereto is slideably and releaseably mounted to the elongate shaft member via a through bore or aperture formed in the weight mounting carriage and weights.

Preferably, the elongate shaft member comprises a plurality of spaced apart connection apertures and the weight mounting carriage is operable to connect to the elongate shaft member via the connection apertures.

Preferably, the weight mounting carriage comprises actuator means operable to be toggled between an engaged configuration and a moveable configuration, whereby in the locked configuration the weight mounting carriage is locked to the elongate shaft member via a connection aperture, and in the moveable configuration the weight mounting carriage is operable to slide along and be located in a desired position on the elongate shaft member.

Preferably, in the locked configuration a locking pin of the weight mounting carriage extends through a connection aperture of the elongate shaft member.

SUMMARY OF THE INVENTION

The present invention is an exercise device that is designed to use in physical therapy for the treatment tennis elbow or lateral epicondylopathy (LE) and for post-surgical rehabilitation and other upper limb rehabilitation. The exercise device has a main body. At least one gripping means is provided on the main body. Each gripping means includes a rotatable hand grip and mode selector means. The mode selector means is operable to move the gripping means from a first configuration to a second configuration. In the first configuration, the rotatable hand grip is rotatable relative to the main body. In the second configuration the rotatable hand grip is in a fixed position and not rotatable relative to the main body. In addition to the rotatable hand grip, a locked grip is provided on the main body. Accordingly, a user can hold the exercise device with both hands, wherein one hand holds the rotatable grip and the other hand holds the static grip to perform exercises. External weight can be added to the exercise device. The distance between the hand grips and the weights can be adjusted to provide different resistances to the movement of the exercise devise at the handles.

BRIEF DESCRIPTION OF THE DRAWINGS

The invention will be more clearly understood from the following description of some embodiments thereof, given by way of example only, with reference to the accompanying drawings, in which:

FIGS. 31 to 34 show alternative configurations for using the exercise device configured according to the present invention.

DETAILED DESCRIPTION OF THE DRAWINGS

Figure 1:
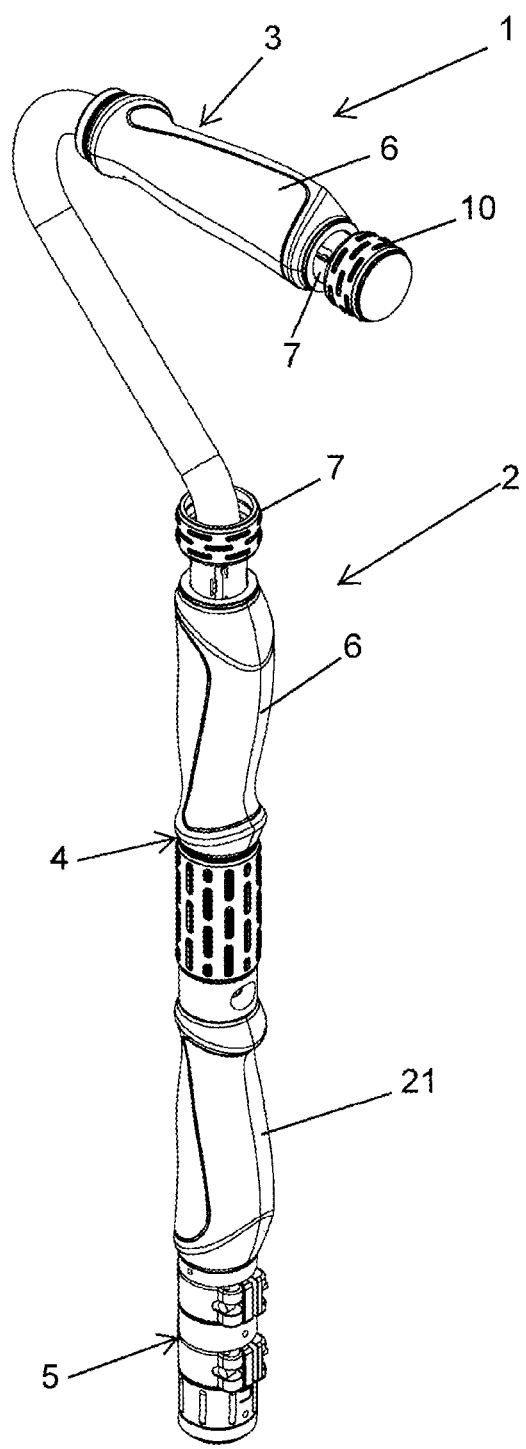
FIG. 1 is a perspective view of an exercise device according to the invention.
Figure 2:
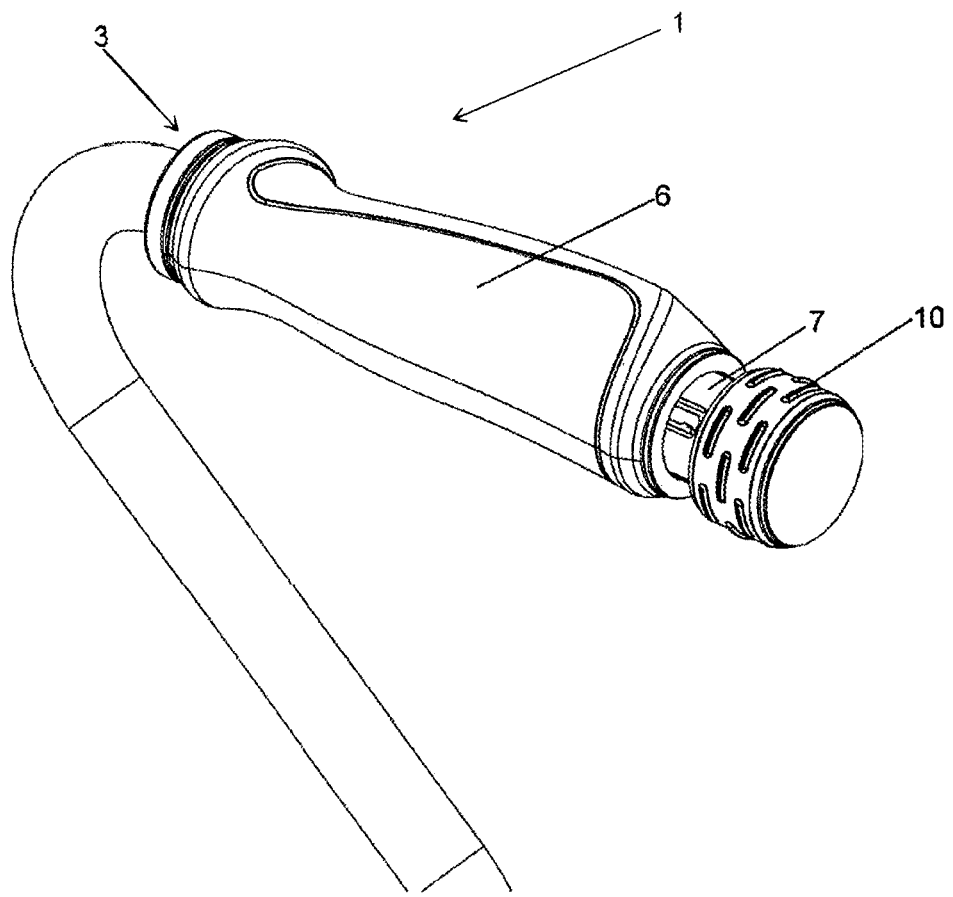
FIG. 2 is a detail perspective view of a first section of the exercise device shown in FIG. 1.
Figure 3:
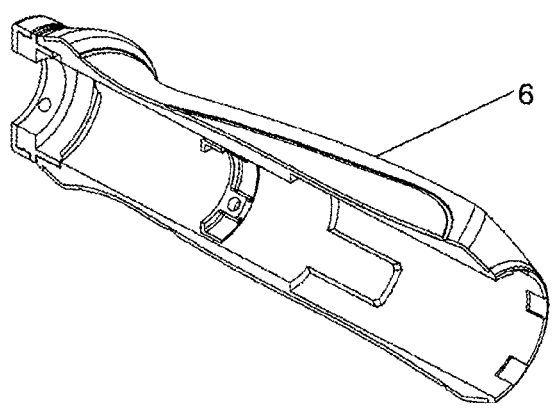
FIG. 3 is perspective view of a grip of the first section of the exercise device shown in FIG. 1.
Figure 4:
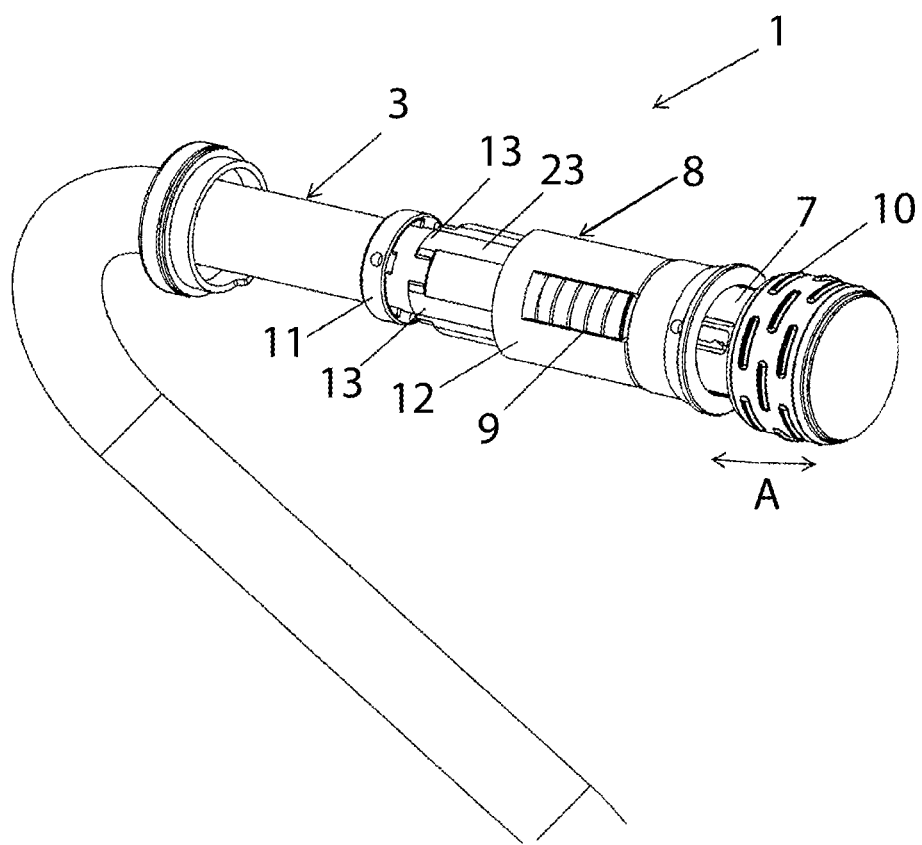
FIG. 4 is a cut away perspective view of the first section of the exercise device shown in FIG. 1.
Figure 5:
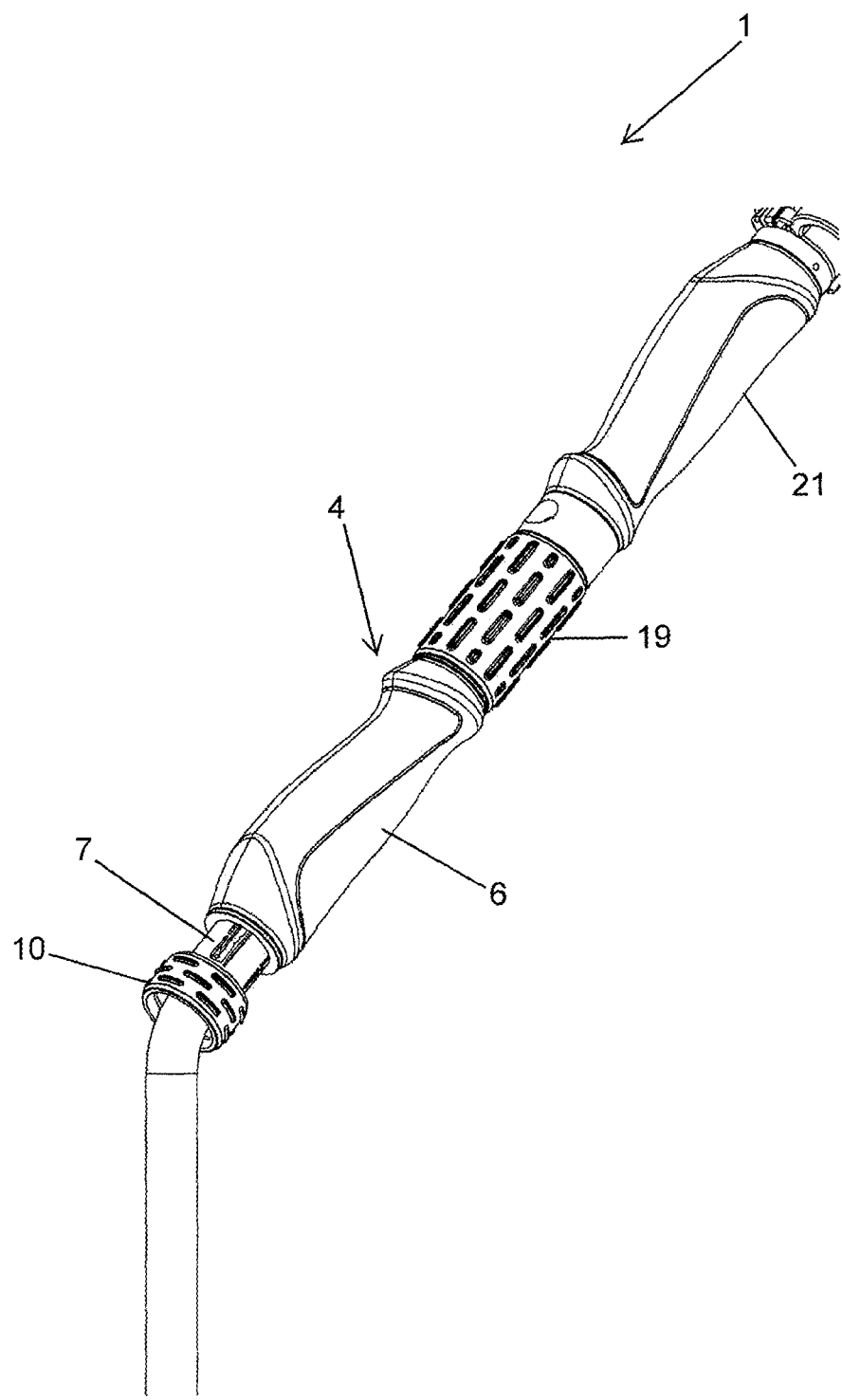
FIG. 5 is a detail perspective view of a second section of the exercise device shown in FIG. 1.
Figure 6:
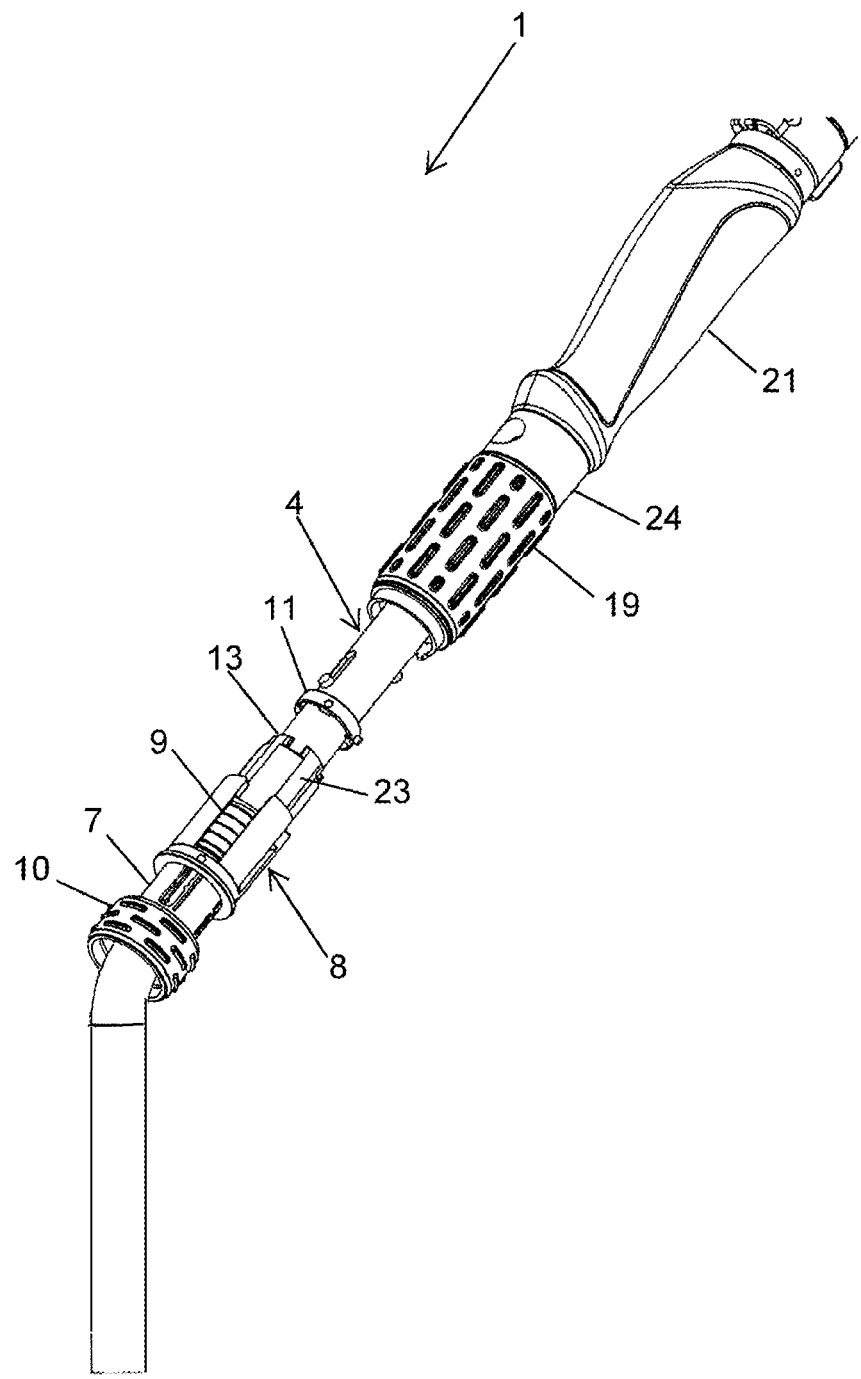
FIGS. 6 to 11 are cut away perspective views of a second section of the exercise device shown in FIG. 1.
Figure 7:
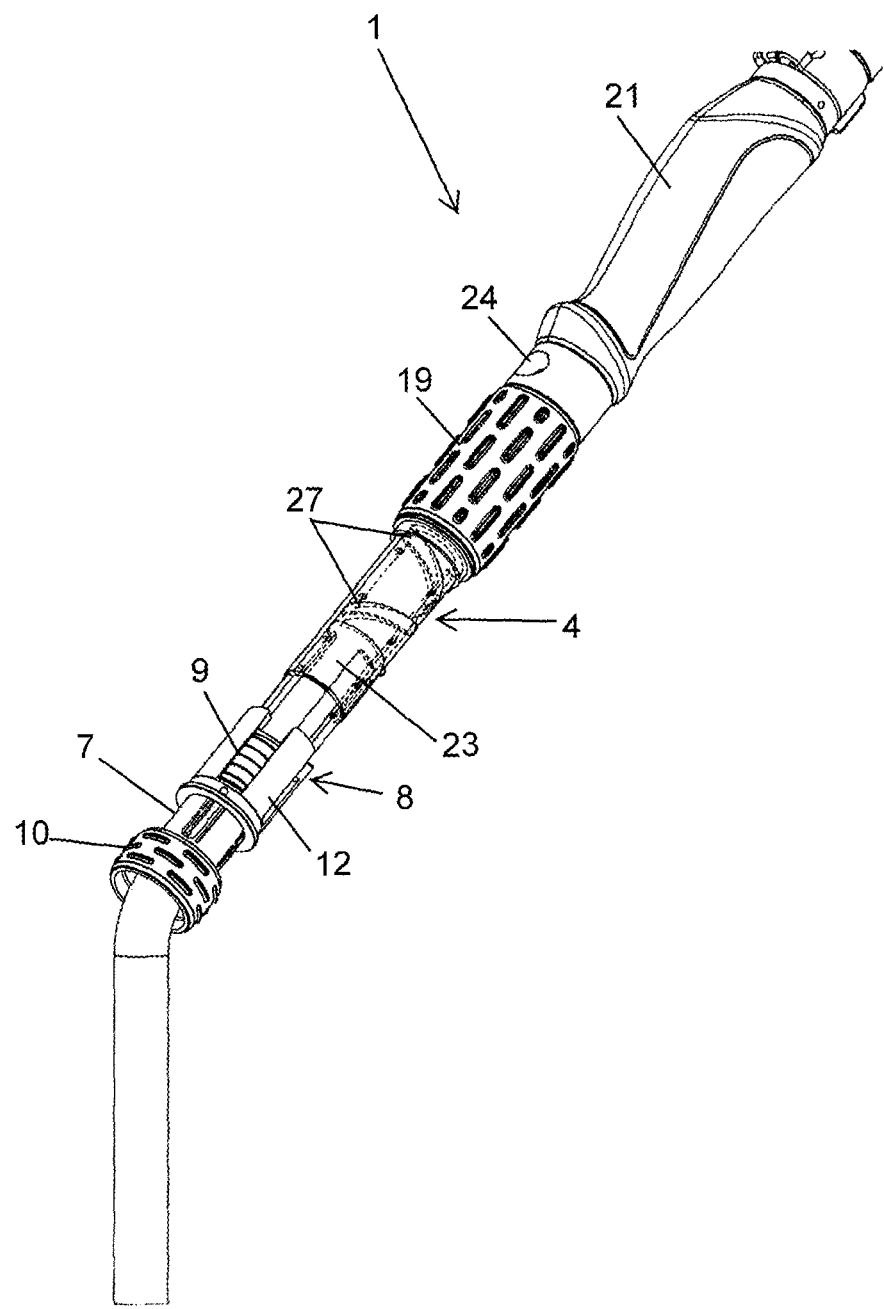
Figure 8:
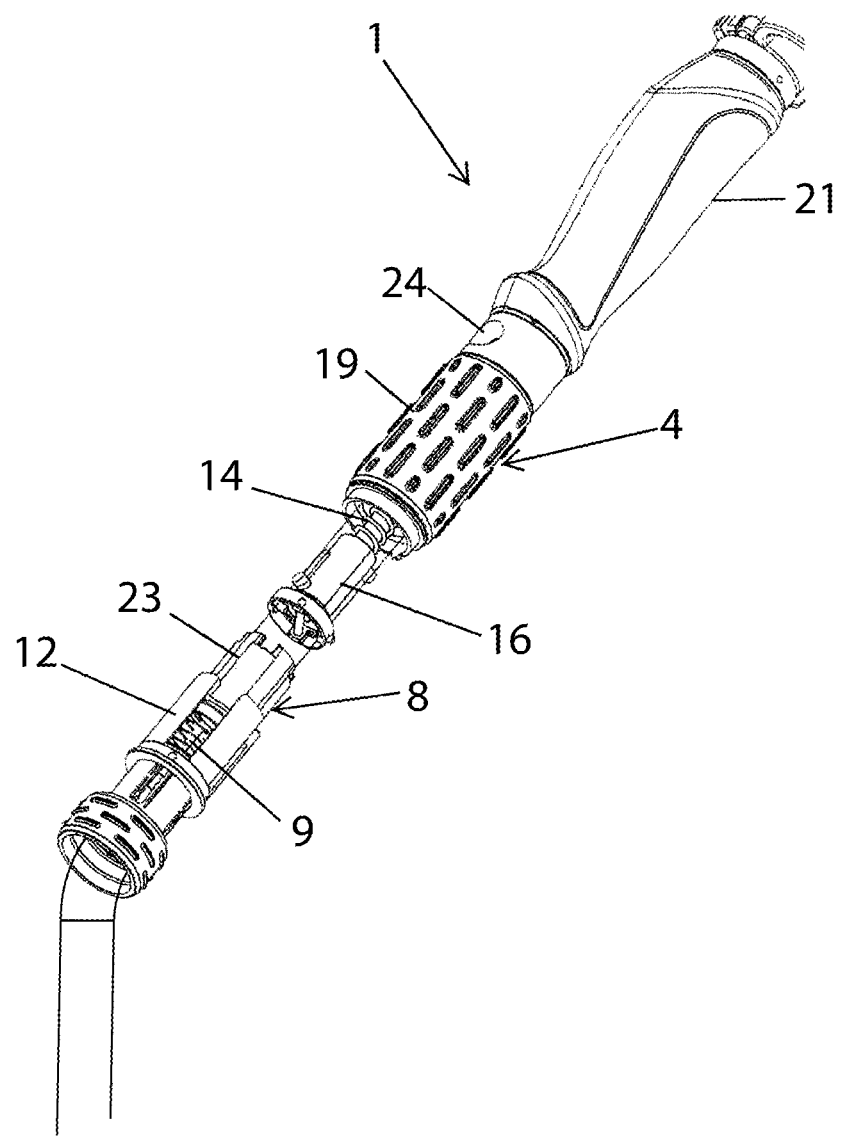
Figure 9:
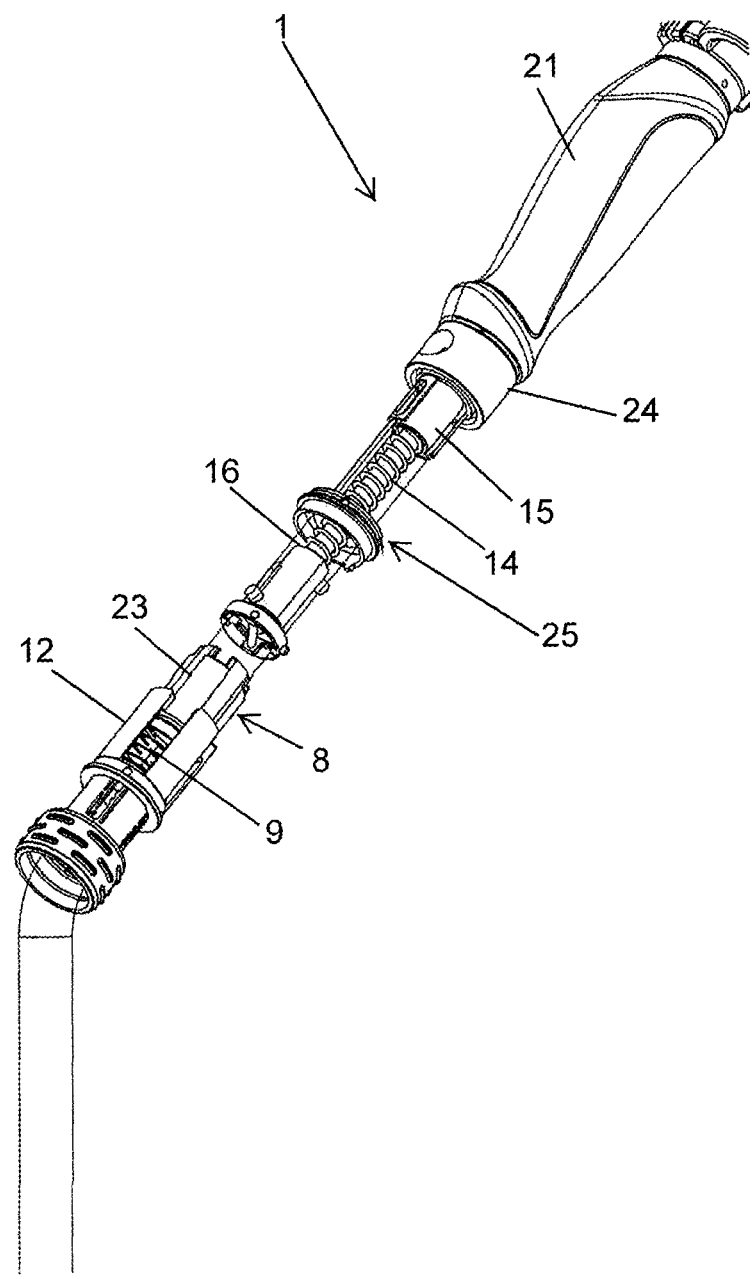
Figure 10:
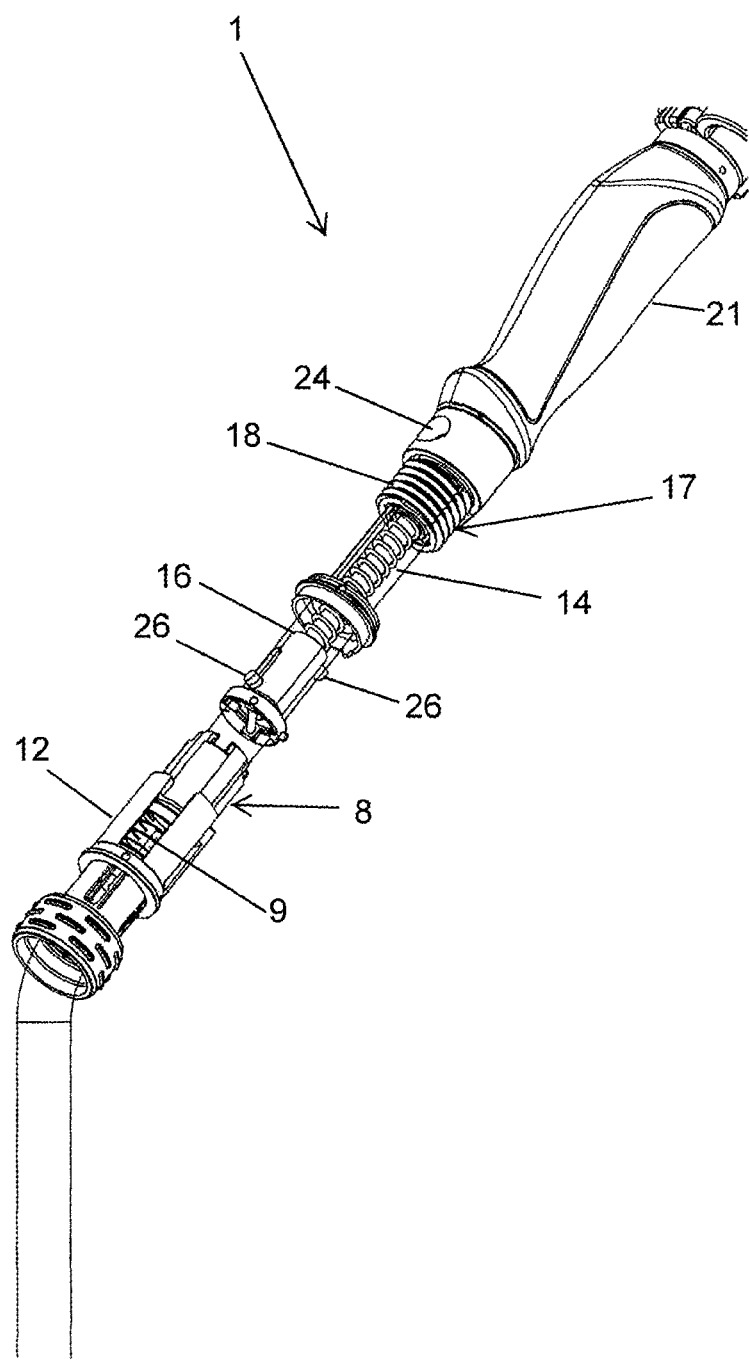
Figure 11:
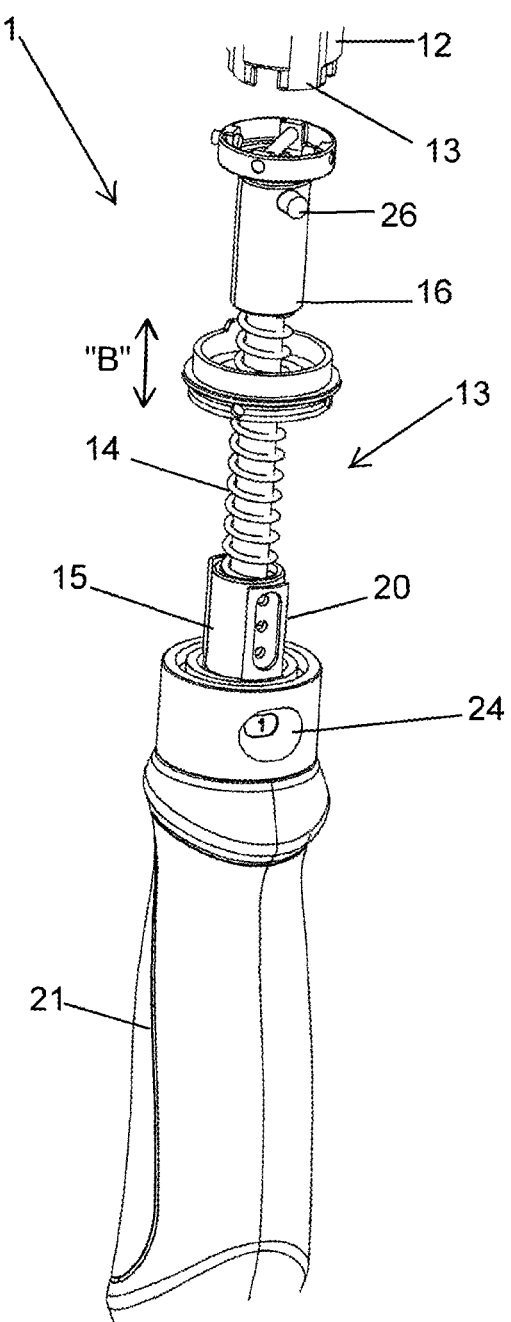
Figure 12:
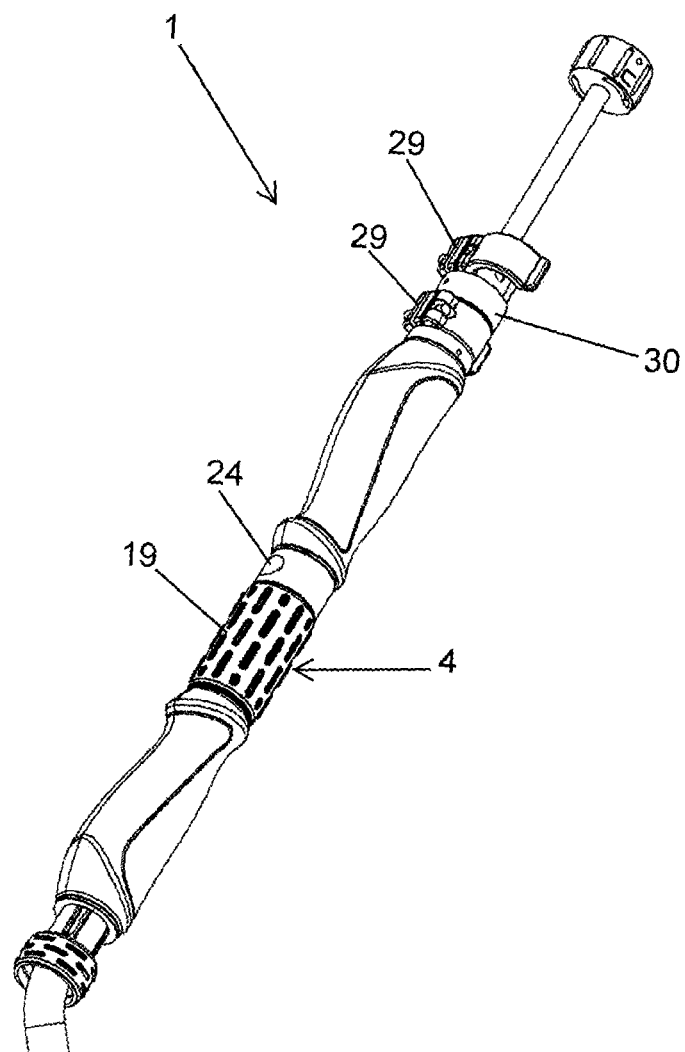
FIGS. 12 to 16 are perspective views of second and third sections of the exercise device according to the invention.
Figure 13:
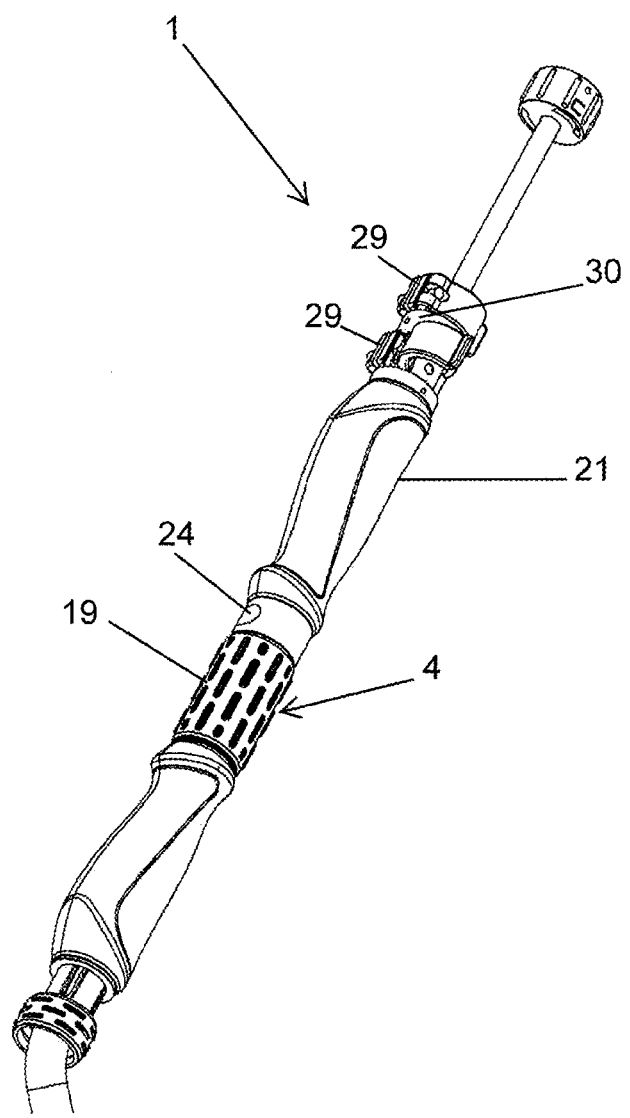
Figure 14:
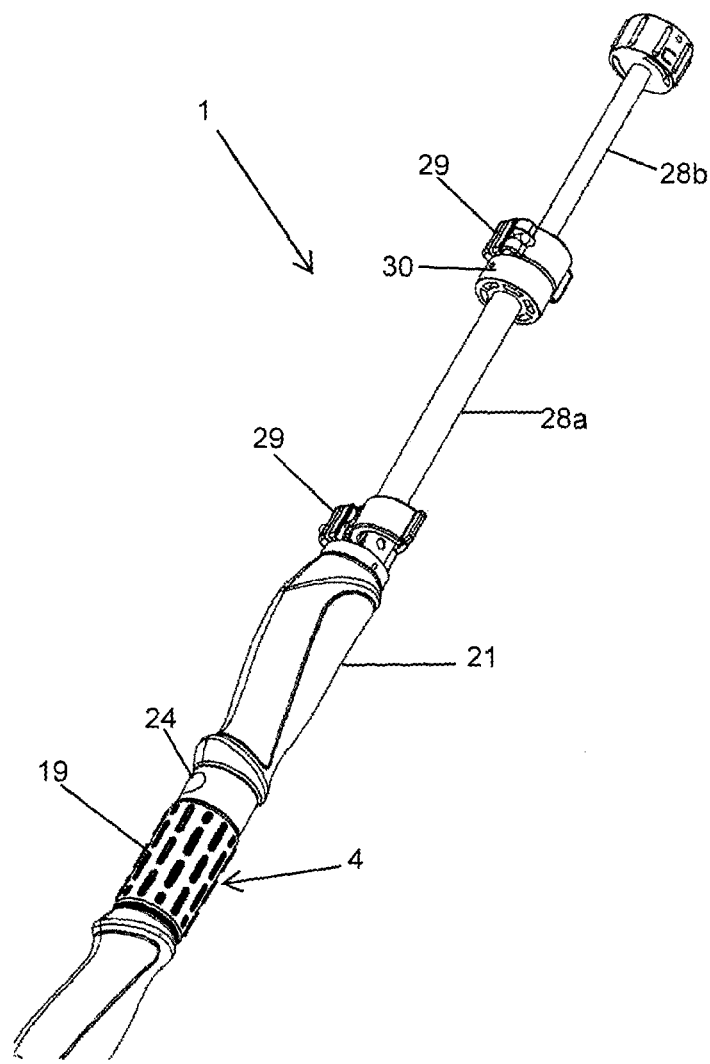
Figure 15:
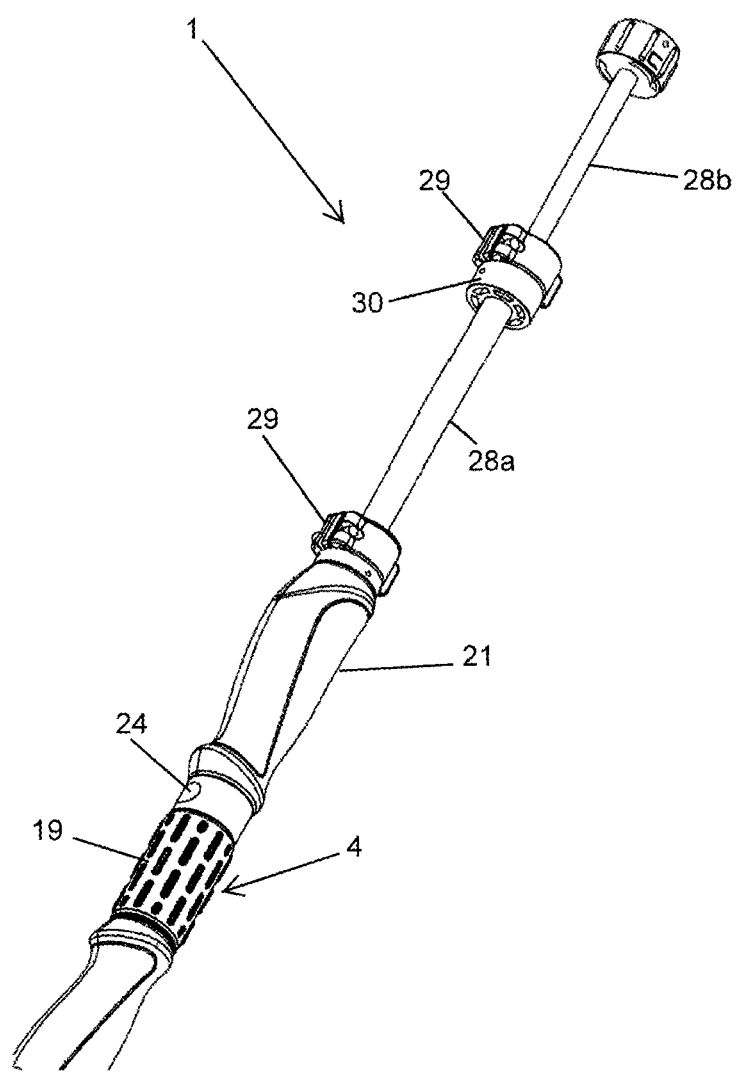
Figure 16:
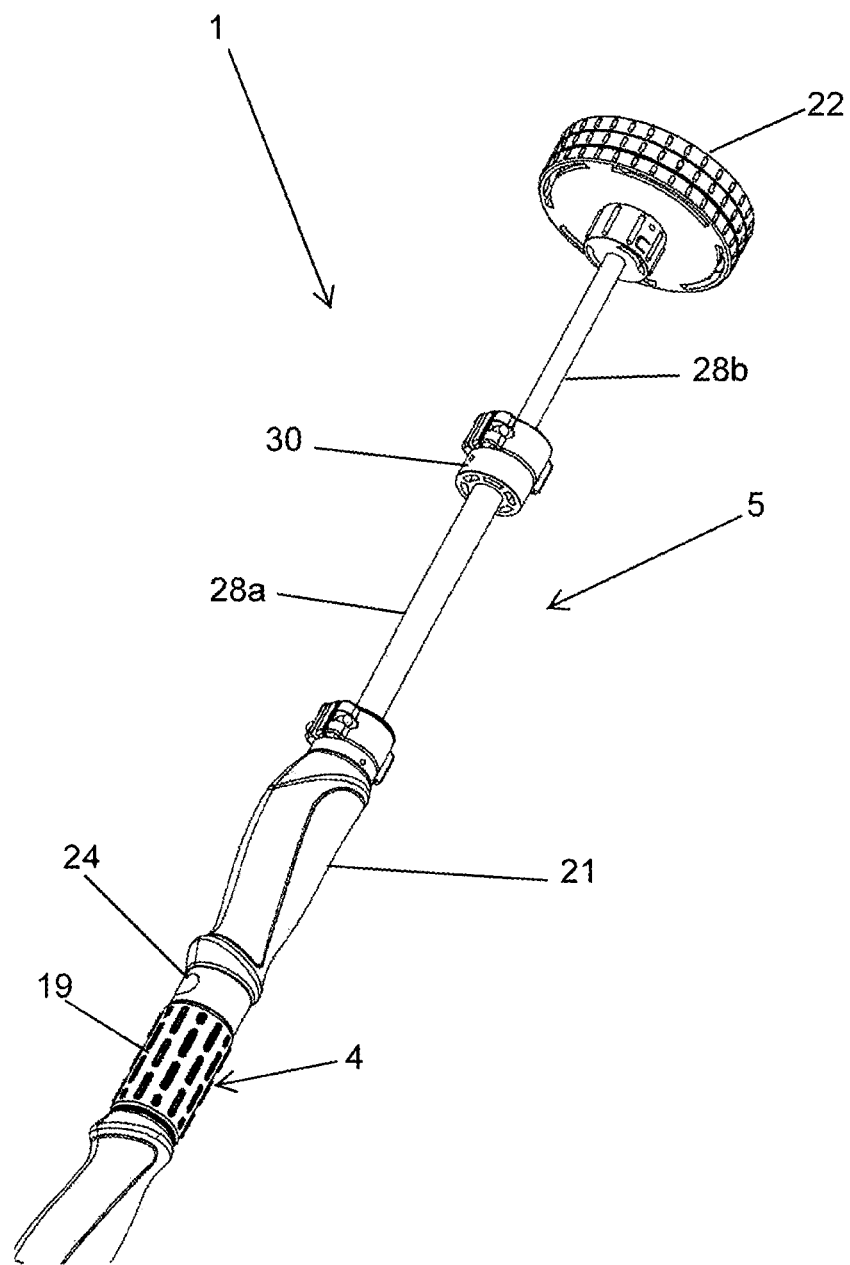
Figure 17:
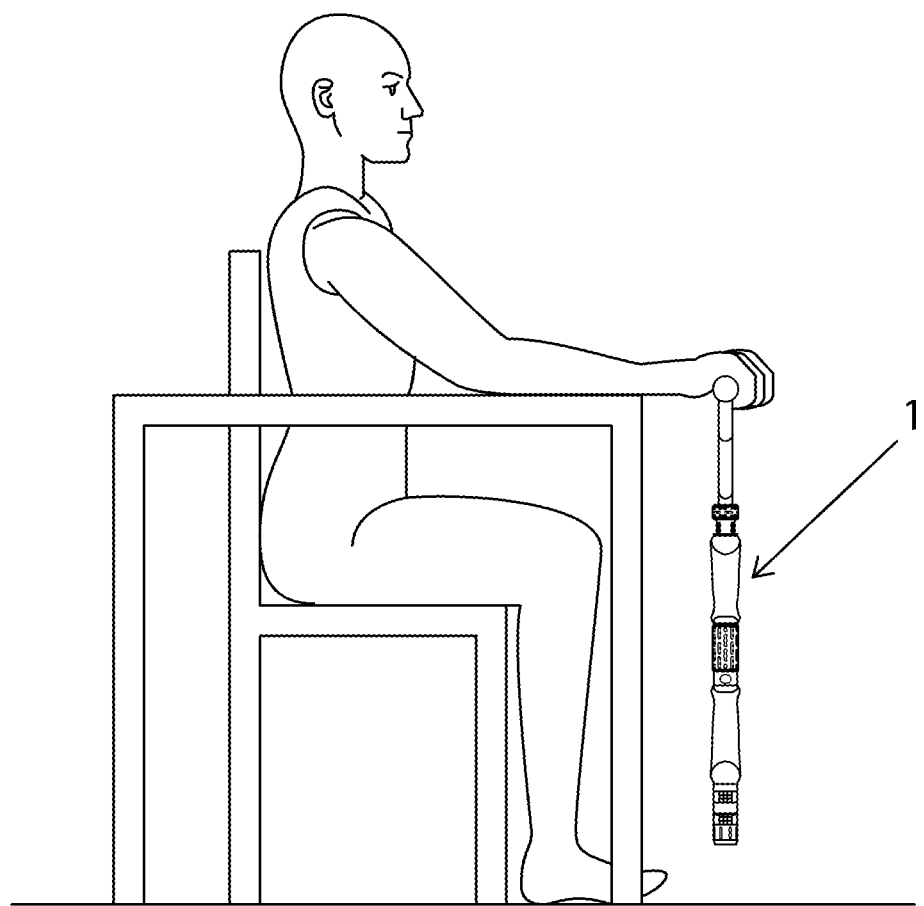
FIGS. 17 to 22 are views showing a range of exercises performed using the exercise device according to the invention.
Figure 18:
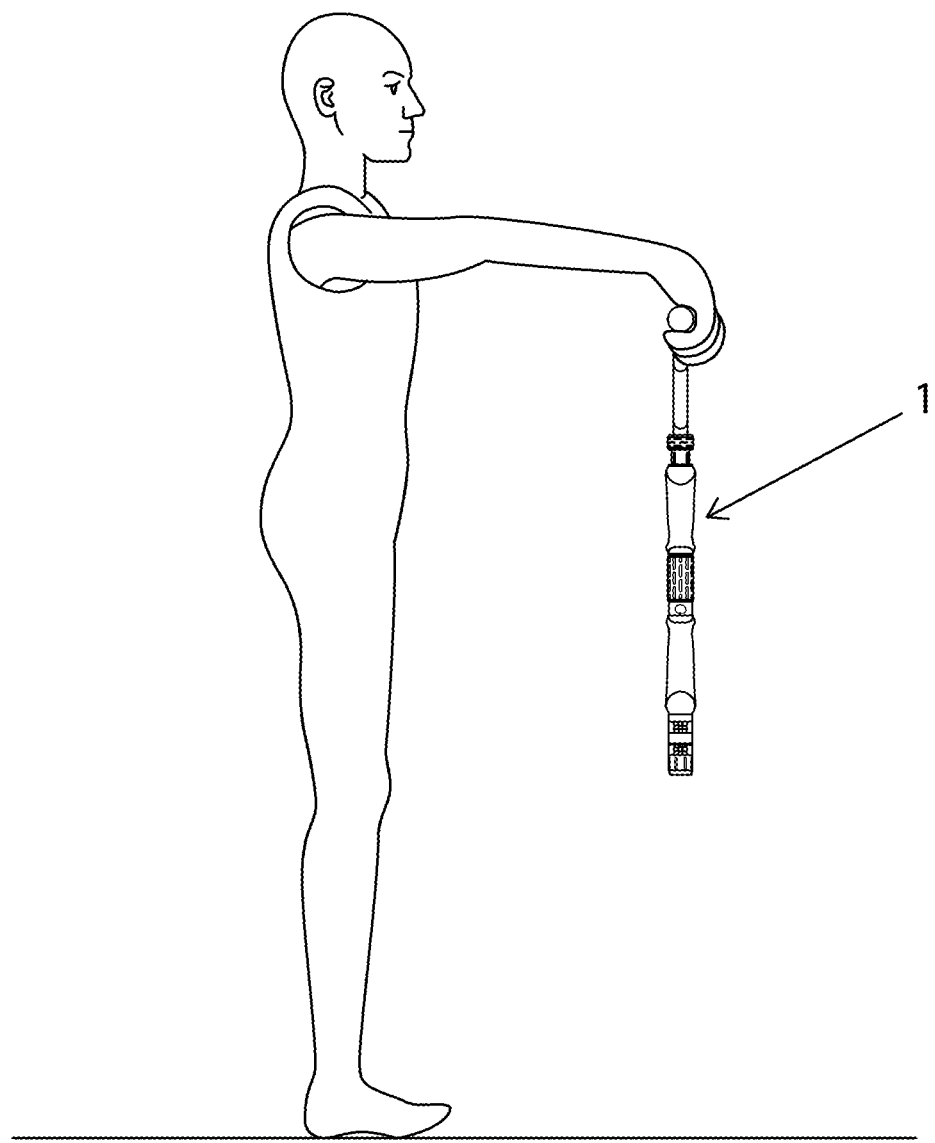
Figure 19:
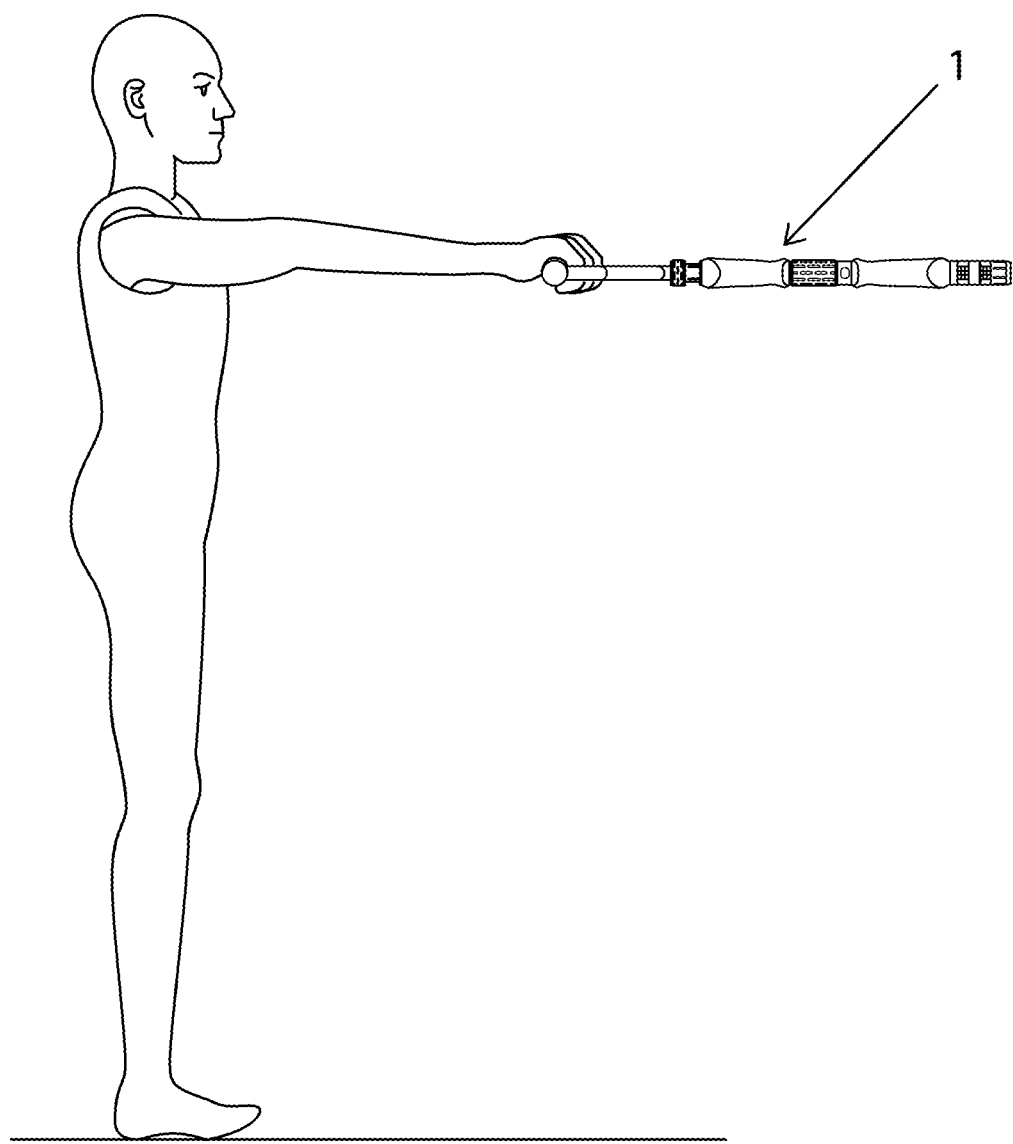
Figure 20:
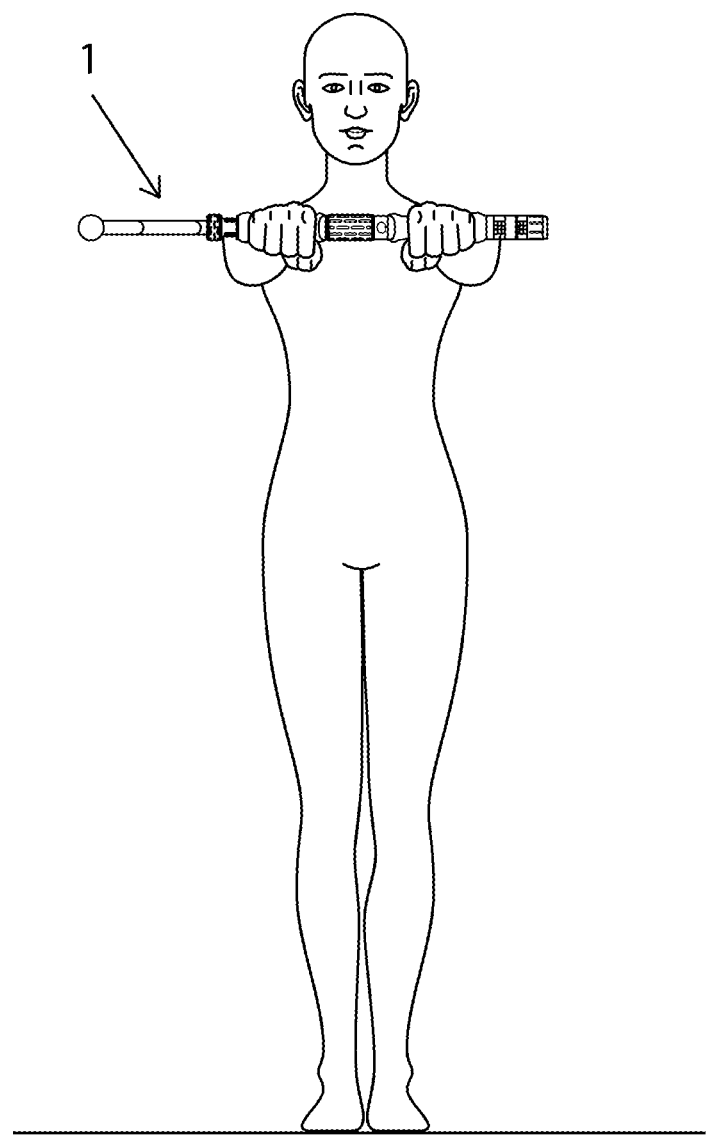
Figure 21:
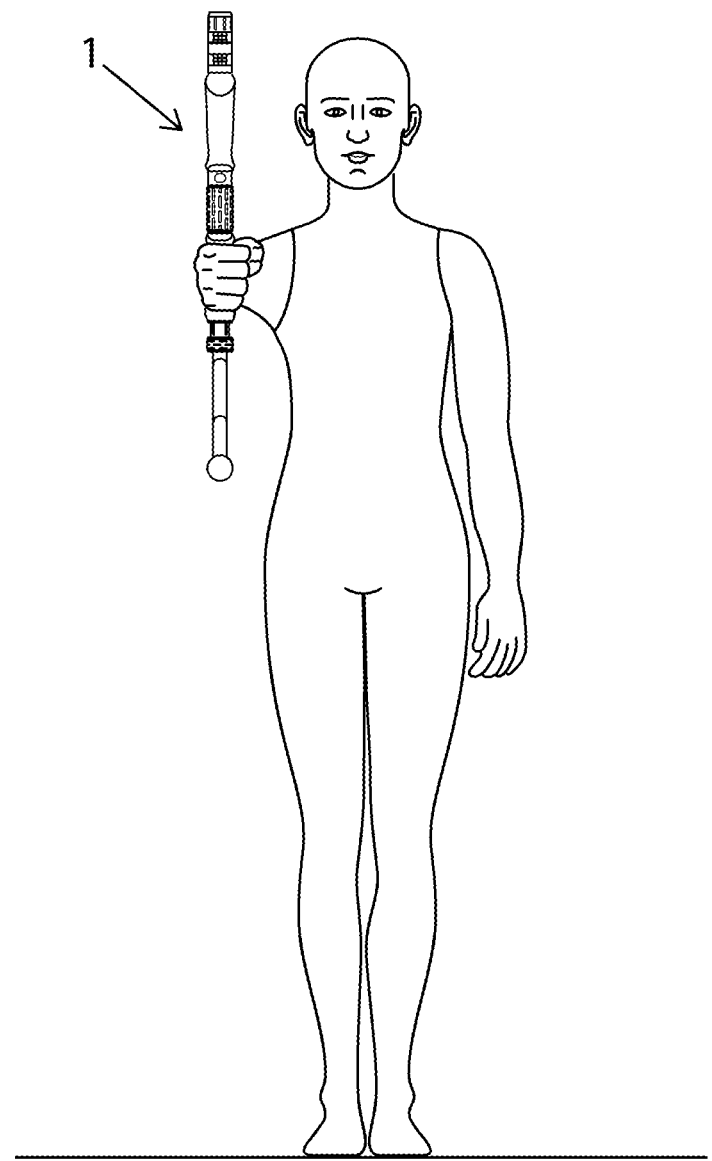
Figure 22:
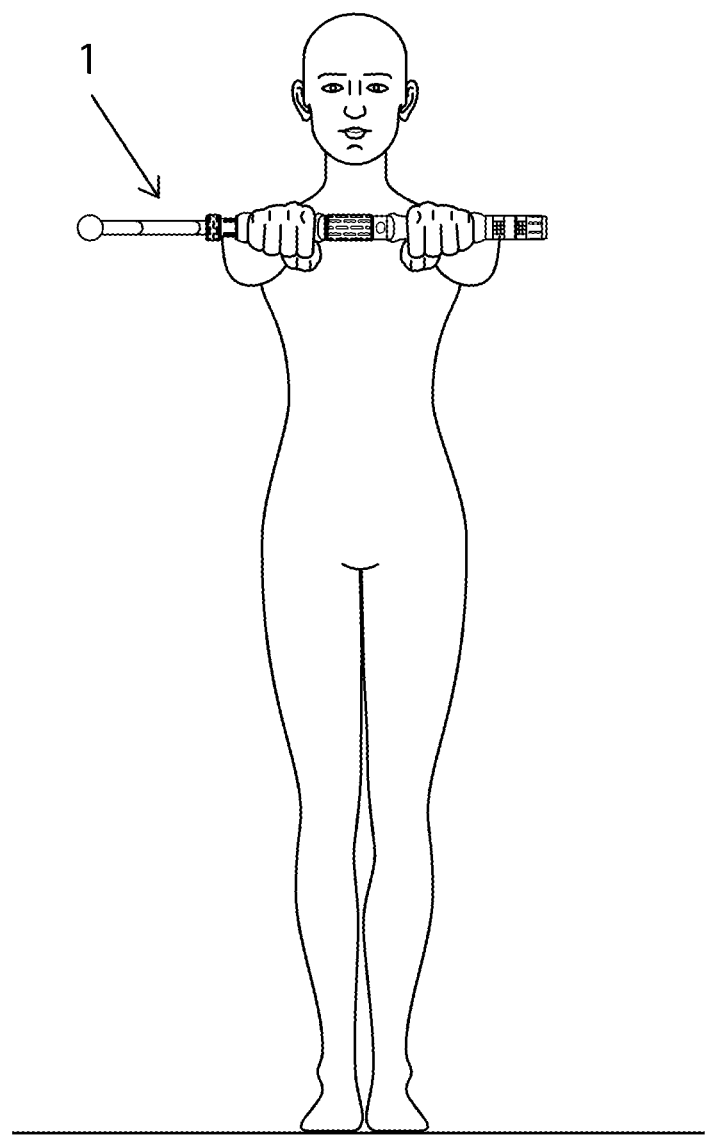

According to the drawings, there is an exercise device, indicated generally by the reference numeral 1, comprising a main body, indicated generally by the reference numeral 2. In the embodiment shown, the main body 2 has a plurality of interlinked sections comprising a first elongate section 3, a second elongate section 4 and a third section 5. The first elongate section 3 is arranged substantially perpendicularly to the second elongate section 4, although it will be understand that said first section 3 may extend at any angle to the second section 4 as required or as desired. The sections 3, 4, 5 are integrally formed and the third section 5 is operable to extend and retract telescopically from the second section 4.

The exercise device 1 comprises gripping means comprising at least one rotatable hand grip 6 and mode selector means 7 operable to move the gripping means from a first configuration in which the rotatable grip 6 is rotatable relative to the main body 2 and a second configuration in which the grip 6 is locked in a fixed position and not rotatable relative to the main body 2. The exercise device 1 further comprises tensioning means 8 operable to impart a resistance on the rotatable grip 6 as it is rotated in the first configuration.

Connected to the mode selector means 7 is an actuator or knob 10 to move the mode selector means 7 between the first configuration and the second configuration. In operation, the actuator 10 is moved between a retracted and an advanced position, such movement indicated by the direction arrow 'A', relative to the main body 2 to move the mode selector means 7 so that the gripping means is operable between the first configuration and the second configuration.

The exercise device 1 further comprises a first compression spring 9 mounted on the main body 2 and a radial collar 11 connected to the main body 2. The first compression spring 9 is positioned between opposing spring seats (not shown) and a locking sleeve 12 housing compression spring 9 is connected to the rotatable grip 6, whereby in the retracted position of the actuator 10 the locking sleeve 12 is disengaged from the radial collar 11 allowing for rotation of the grip 6 about the main body 2. Conversely, in the advanced position of the actuator 10 the locking sleeve 12, and in particular, locking projections 13 of the sleeve 12 are engaged with the radial collar 11 which prevent rotation of the sleeve 12 and grip 6, which is connected to the sleeve 12, about the main body 2.

In the first configuration the rotatable grip 6 rotates up to a maximum of about 180 degrees relative to the main body 2, and preferably, to a maximum of about 170 degrees relative to the main body 2 in either direction, although it will be understood that the grip 6 may be adapted by appropriate modification to rotate between 1 degrees and 360 degrees.

To implement the operation of grip 6 on the first section 3, the mode selector means 7 and the locking sleeve 12 are connected so that the linear positions of both are controlled simultaneously. The locking sleeve 12 travels linearly along the main body 2 inside the grip 6 via a series of interconnected linear splines 23 that force the locking sleeve 12 and the grip 6 to rotate simultaneously around the mode selector means 7. In the locked state of the grip 6, the mode selector means 7 is fully advanced, which forces the locking sleeve 12 to slide forward, engaging the locking projections 13 with locking collar 11. Conversely, in the free-to-rotate mode, the mode selector actuator 10 is fully retracted, which disengages the locking projections 13 from the locking collar 11, allowing the grip 6 to rotate about the main body 2.

Grip 6 on the first section 3 may be used in two modes in which the grip 6 is operable to rotate about the main body 2 according to the first configuration, and in which the grip 21 is locked or fixed relative to the main body 2 and not able to rotate. Selection of the mode of operation is made by advancing or retracting the mode selector actuator 10 in which in the fully inserted position the mode selection means places the grip 6 in the locked state, and in the fully retracted position of the actuator the grip 6 is operable to rotate freely up to about 170 degrees in either direction.

The mode selector means 7 is adapted to be further operable to be moved to a third configuration in which the rotatable grip 6 is rotatable under an adjustable resistance relative to the main body 2. To operate in the third configuration, the exercise device 1 further comprises a tension or compression adjustment actuator 19 coupled to a resistance adjustment means, indicated generally by the reference numeral 25, operable to impart an adjustable resistance on the rotatable grip 6 as it is rotated in the third configuration.

The resistance adjustment means 25 comprises a second compression spring 14 operable between a first spring seat 15 and a second spring seat 16 positioned within the main body 2, in which one or both of the first and the second spring seat 15, 16 is movable within the main body 2 to set a distance indicated by the arrow 'B' (i.e. increase and decrease the distance) between the spring seats 15, 16 to thereby adjust the length and compression of the second compression spring 14 and set the tension or compression thereof. The resistance adjustment means 25 further comprises spring seat movement means 17 to independently move the first spring seat 15 within the main body 2 to increase and decrease the distance between the first and the second spring seats 15, 16 to adjust the tension or compression of the second compression spring 14.

As shown, the spring seat movement means 17 comprises a spring sleeve 18 connected to the first spring seat 15 via a connector 20. The first spring seat 15 is moved by rotating the tension or compression adjustment actuator 19 which in turn moves the spring sleeve 18 and thereby the first spring seat linearly 15 along the main body 2 toward and away from the second spring seat 16 to set a length and so the tension or compression of the second compression spring 14 for the third configuration. Rotation of the rotatable grip 6 is operable to move the second spring seat 16 toward the first spring seat 15 and compress the second spring 14. The grip 6 is connected to the locking sleeve 12 by lugs 26 provided on the second spring seat 16 which move along helical channels 27 provided on the locking sleeve 12 to move the second spring seat 16 forward and back as the grip 6 is rotated.

The resistance adjustment actuator 19 is further operable to provide a plurality of tension and/or compression settings in which each setting corresponds to a distance of the first spring seat 15 to the second spring seat 16.

The rotatable grip 6 of the second section 4 thus operates in a similar fashion to the rotatable grip 6 provided on the first section 3 of the exercise device 1, but in the embodiment shown has three modes of operation instead of two modes; namely a first configuration in which the hand grip 6 is free-to-rotate, a second configuration in which the hand grip 6 is fixed and locked so that it may not rotate about the main body 2, and a third configuration in which the amount of resistance of the grip when rotating is able to be set by operation of the tension or compression adjustment actuator 19.

To provide the third configuration, mode selector means 7 and spring sleeve 18 are connected such that their linear position on the main body 2 is controlled simultaneously so that the locking sleeve 12 is able to travel in a linear fashion along the main body 2 inside grip 6 via a series of interconnected linear splines 23 which force the two parts to rotate simultaneously around the mode selector means 7.

In the third configuration, the mode selector actuator 10 is positioned at the midpoint of its travel which disengages the projections 13 of the locking sleeve 12 from the radial collar 11. In this configuration, and during rotation of the grip 6, the locking sleeve 12 remains engaged with the second spring seat 16 via helical channels 27 formed in the locking sleeve 12, and lugs 26 projecting from the second spring seat 16 slide along the helical channels or pathways 27 provided on an underside surface of the locking sleeve 12. When grip 6 is rotated, the second spring seat 16 is advanced, which puts force on the second compression spring 14 and it is this compressional force that translates into torsional resistance that the end-user feels as they rotate the grip 6.

The amount of resistance can be increased or decreased by adjusting the position of first spring seat 15 using the tension or compression adjustment actuator 19. By rotating the tension or compression adjustment actuator 19 the second spring seat 16 either advances to compress the second compression spring 14, which increases the torque required to rotate grip 6, or it retracts to reduce the amount of pre-compression on the spring, resulting in less force being required to rotate grip 6. A tension or compression setting indicator 24 reveals a series of number from 1-10 that are printed on the first spring seat 15, which illustrates the current setting, for example, a numeric printed indicator "1" may show less tension or compression and a numeric printed indicator "10" may show maximum tension or compression.

In the fully retracted position of the tension or compression adjustment actuator 19 the locking sleeve 12 disengages from the second spring seat 16 allowing grip 6 to rotate freely with no resistance in accordance with the second configuration.

The exercise device 1 further comprises a second locked non-rotating hand grip 21 adjacent or beside the rotatable grip 6 such that a user may hold the exercise device 1 with both hands, one hand holding the first rotatable grip 6 and the other hand holding the second locked grip 21.

Weights 22 are operable to be attached to a free end of the exercise device 1, preferably the free end of the third section 5.

In the instance shown in the Figures, a rotatable hand grip 6 operable between a first and second configuration is provided on the first elongate section 3, and a rotatable hand grip 6 operable between first, second and third configurations and a second locked grip 21 is provided on the second section 4 of the exercise device. It will be understood that any arrangement of grips 6, 21 on the main body 2 may be provided as required or as desired, and reference to the specific arrangement shown in the Figures should in no way be seen as limiting.

According to the invention, selection of the mode of operation of the grip 6 provided in the second section 4 is made by advancing or retracting the mode selector actuator 10 provided on the second section 4 of the main body 2. The fully inserted position of the mode selector actuator 10 puts grip 6 into a locked state in which the grip 6 is prevented from rotating, and in the fully retracted position the grip 6 is in the first configuration in which it may rotate freely up to about 180 degrees in either direction. When in a mid-position (i.e. between the fully retracted and fully inserted positon), the grip 6 is placed into exercise mode which is a third configuration in which the amount of resistance of the grip 6 when rotating is able to be set by the tension or compression adjustment actuator 19.

As shown in FIGS. 12 to 15, the exercise device 1 comprises telescopically arranged nested inner tube 28b and outer tube 28a which are operable to extend from and retract into a free end of the main body 2. A spring-loaded button means 29 controls the position of a locking pin which engages with the corresponding inner tube 28b which when activated slides telescopically into and out of the outer tube 28a via collar 30.

FIGS. 18 to 22 show an assortment of exercises that may be performed using the exercises device 1 according to the invention.

Figure 23:
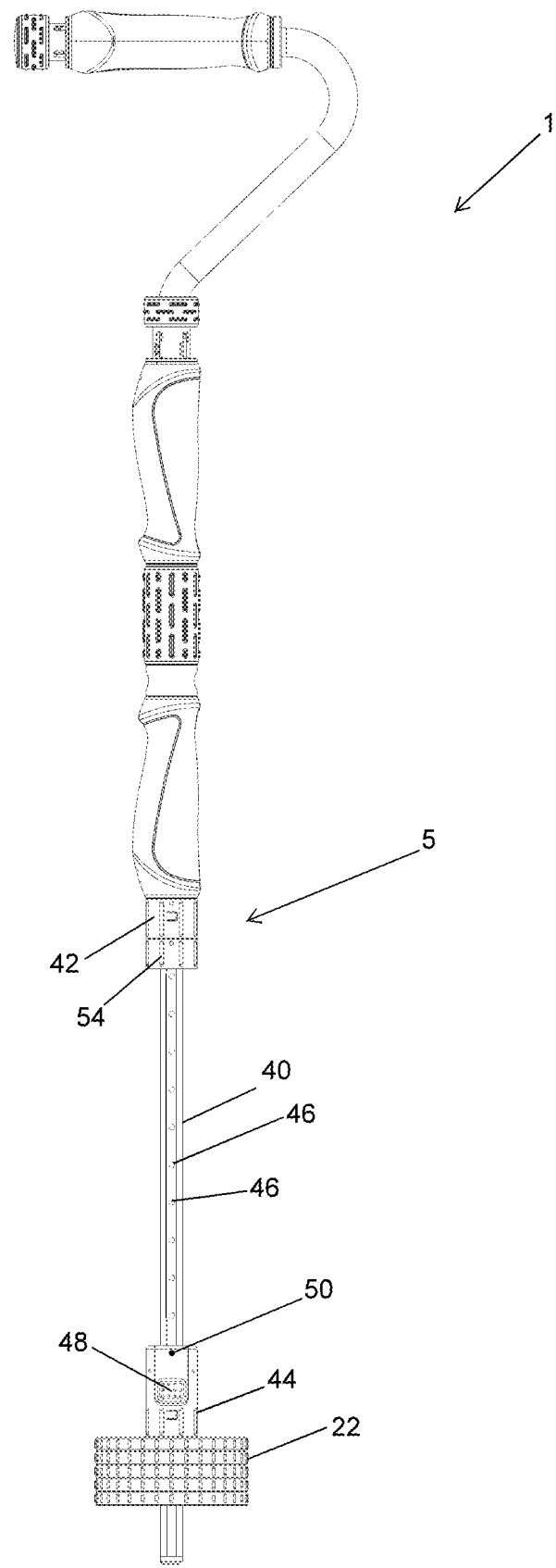
FIGS. 23 and 24 are side views of an exercise device comprising an elongate shaft member mounting weights according to a further embodiment of the invention.
Figure 24:
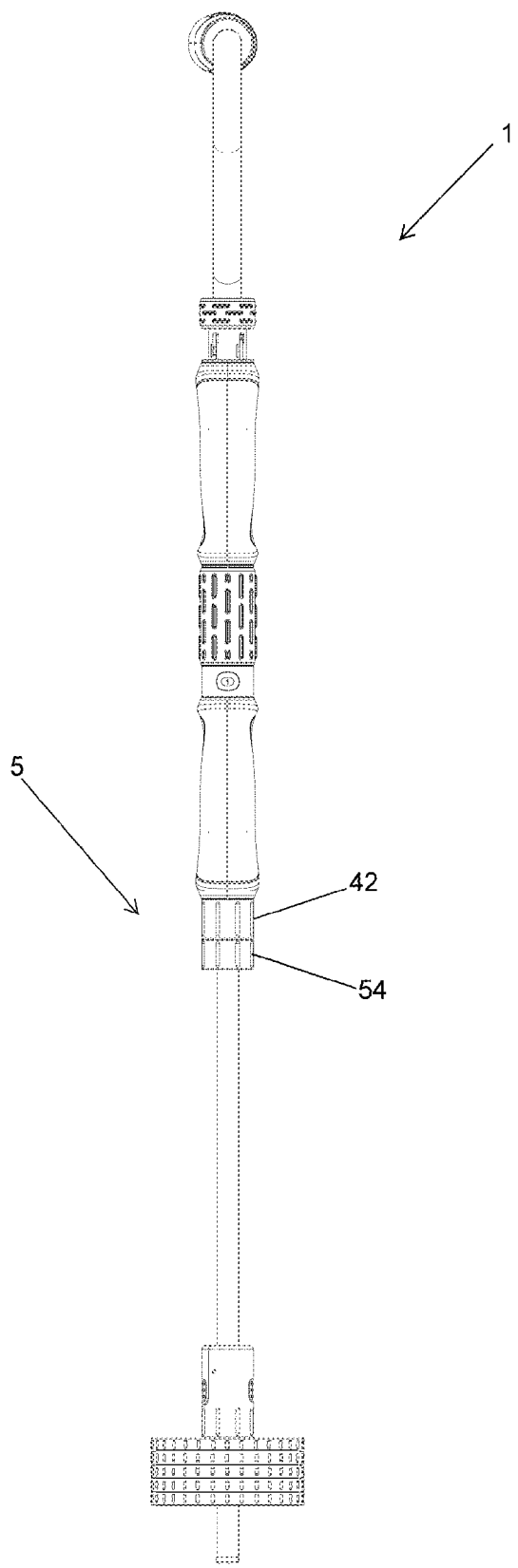
Figure 25:
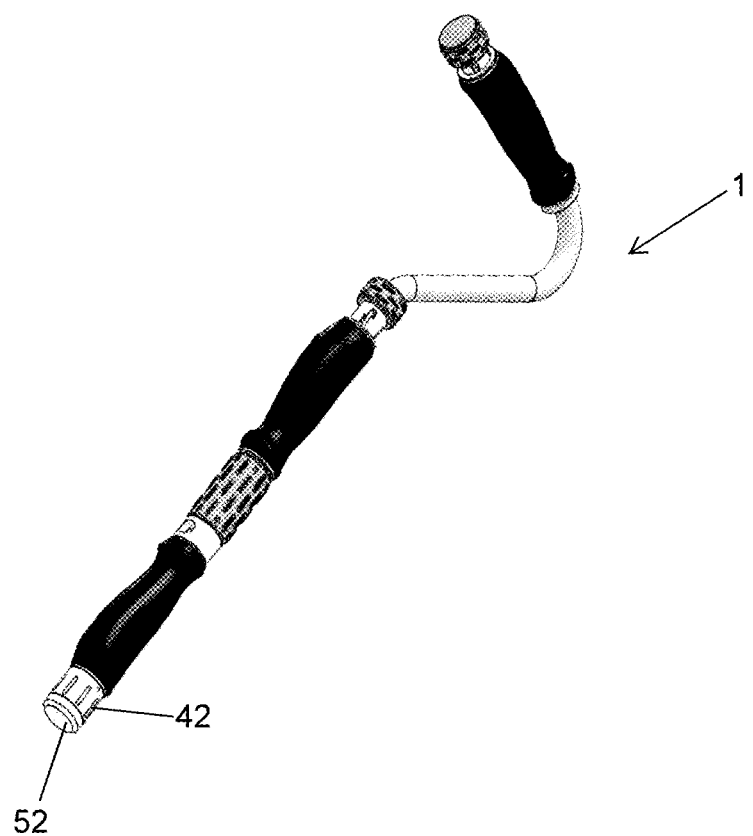
FIGS. 25 to 28 are perspective views showing connection of the elongate shaft member and weight mounting carriage to the exercise device shown in FIGS. 23 and 24.
Figure 26:
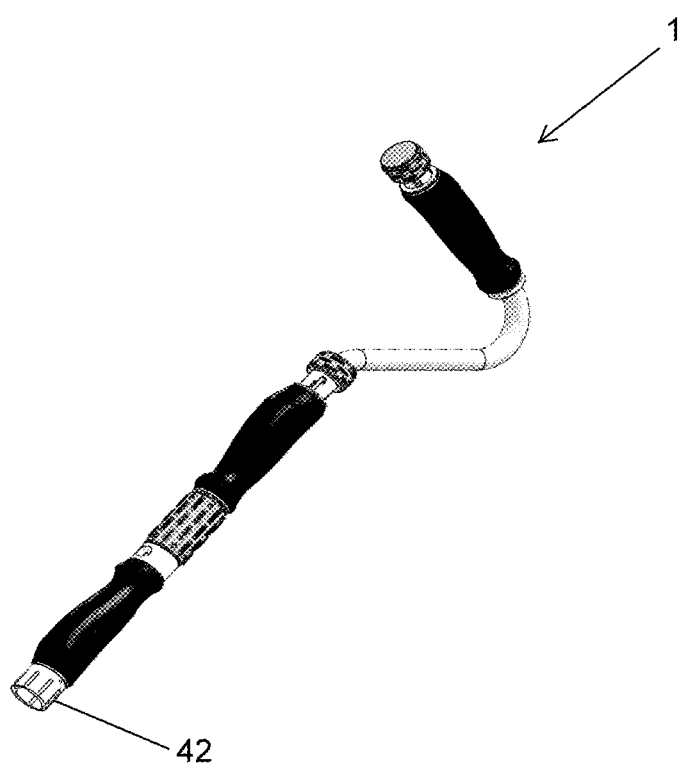
Figure 27:
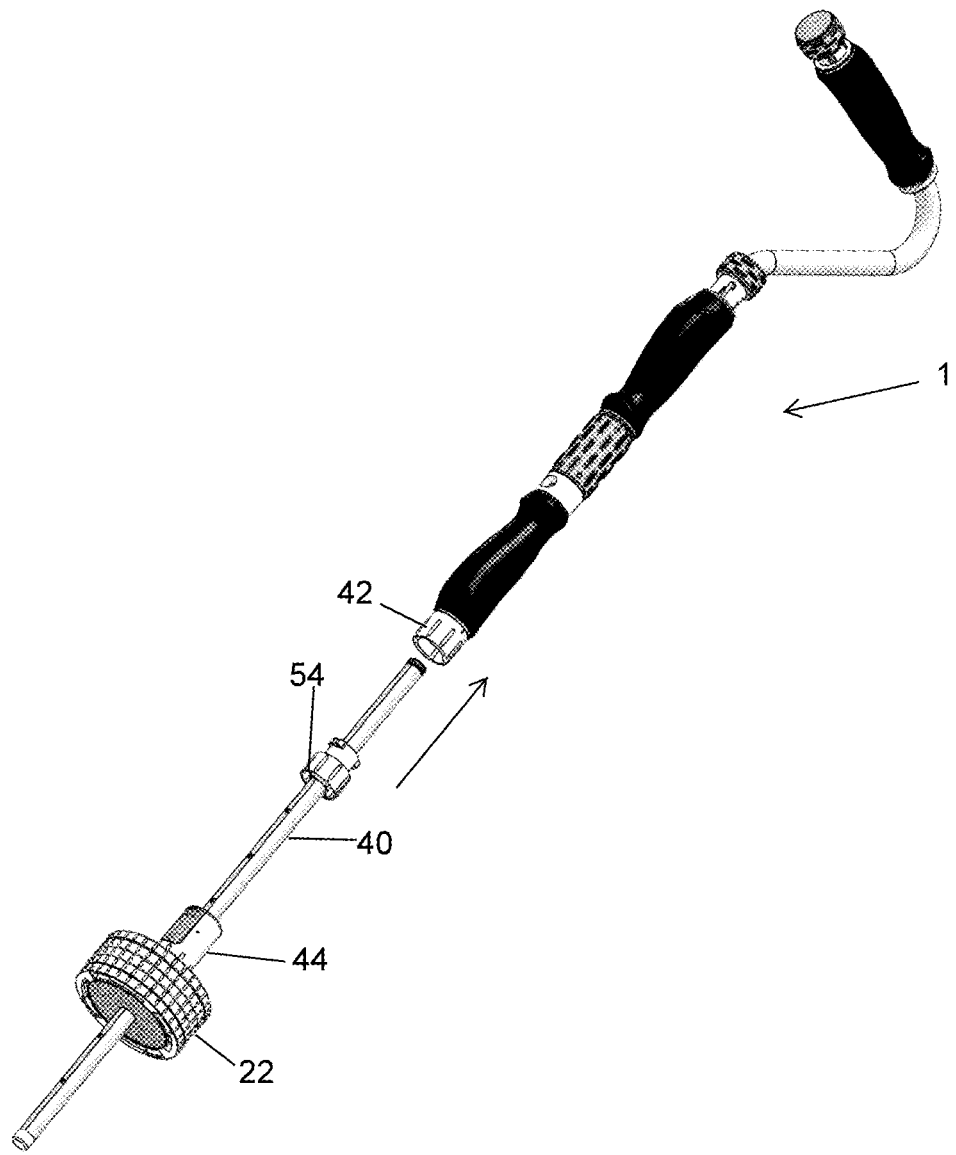

FIGS. 23 and 24 show a further embodiment of the invention in which the exercise device 1 further comprises an elongate shaft member 40 which is operable to be releaseably attached to the connector means 42 provided on the third section 5.

One or more weights 22 are mounted to the elongate shaft member 40. The weights 22 each comprise a through opening or bore enabling mounting to the elongate shaft member 40.

Also shown is a weight mounting carriage 44 which is operable to be positioned manually by a user at a location along the elongate shaft member 40. It will be understood that the weights 22 are connectable to the weight mounting carriage 44 and that the weight mounting carriage 44 together with one or more weights 22 connected thereto are slideably and releaseably mounted to the elongate shaft member 40.

The elongate shaft member 40 comprises a plurality of spaced apart connection apertures 46 and the weight mounting carriage 44 is operable to connect to the elongate shaft member 40 via the connection apertures 46.

The weight mounting carriage 44 further comprises actuator means 48, such as a manually operable push button or lever, that is toggled between an engaged configuration and a moveable configuration, whereby in the locked configuration the weight mounting carriage 44 is locked to the elongate shaft member 40 via a connection aperture 46, and in the moveable configuration the weight mounting carriage 44 is operable to slide along and be located in a desired position on the elongate shaft member 40. In the locked configuration a locking pin 50 of the weight mounting carriage 44 extends through a connection aperture 46 of the elongate shaft member 40.

As shown in FIGS. 25 to 28, to connect the elongate shaft member and weight mounting carriage to the exercise device a user initially removes an end cap 52 off the third section 5 of the device 1 to expose the open ended connector means 42. The end of the elongate shaft member 40 is then pushed into the open ended connector means 42 such that a complimentary connector 54 provided on the elongate shaft member 40 mates with and connects with the connector means 42 of the device 1. The connection system provided by means 42, 54 may be provided by a bayonet connector arrangement or any other means adapted for such mating connection.

Figure 28:
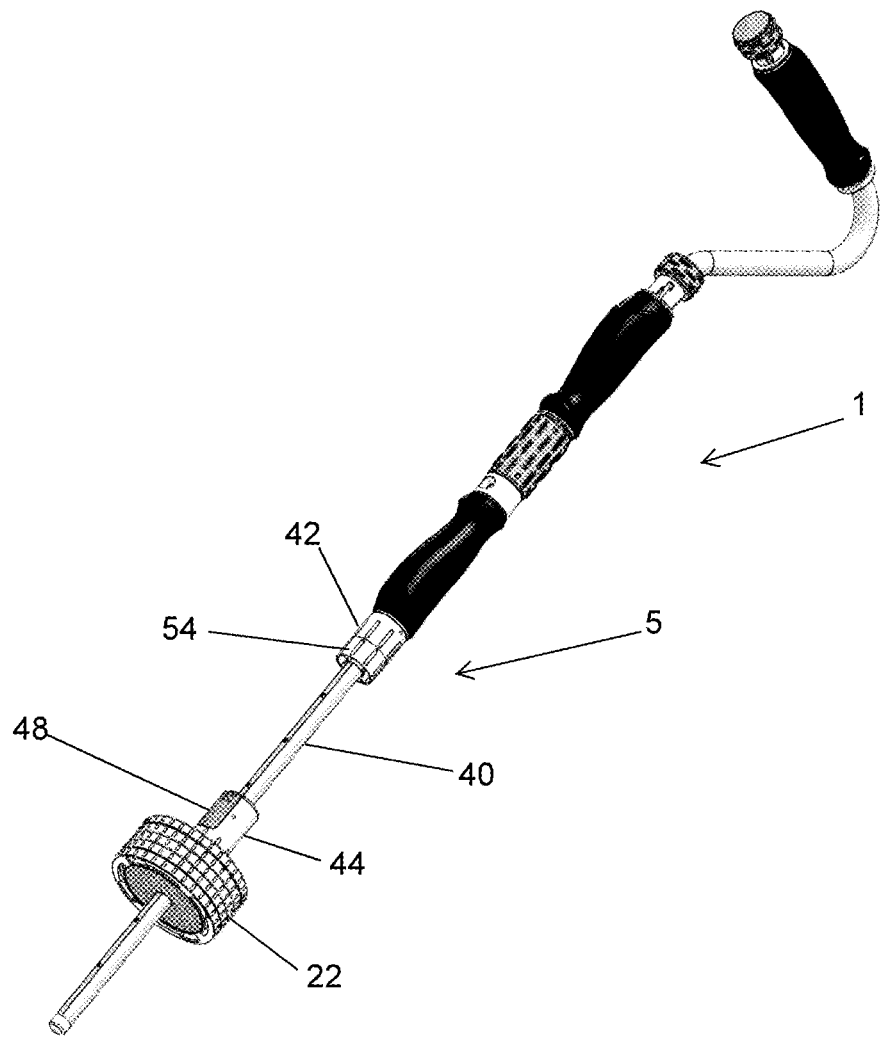
Figure 29:
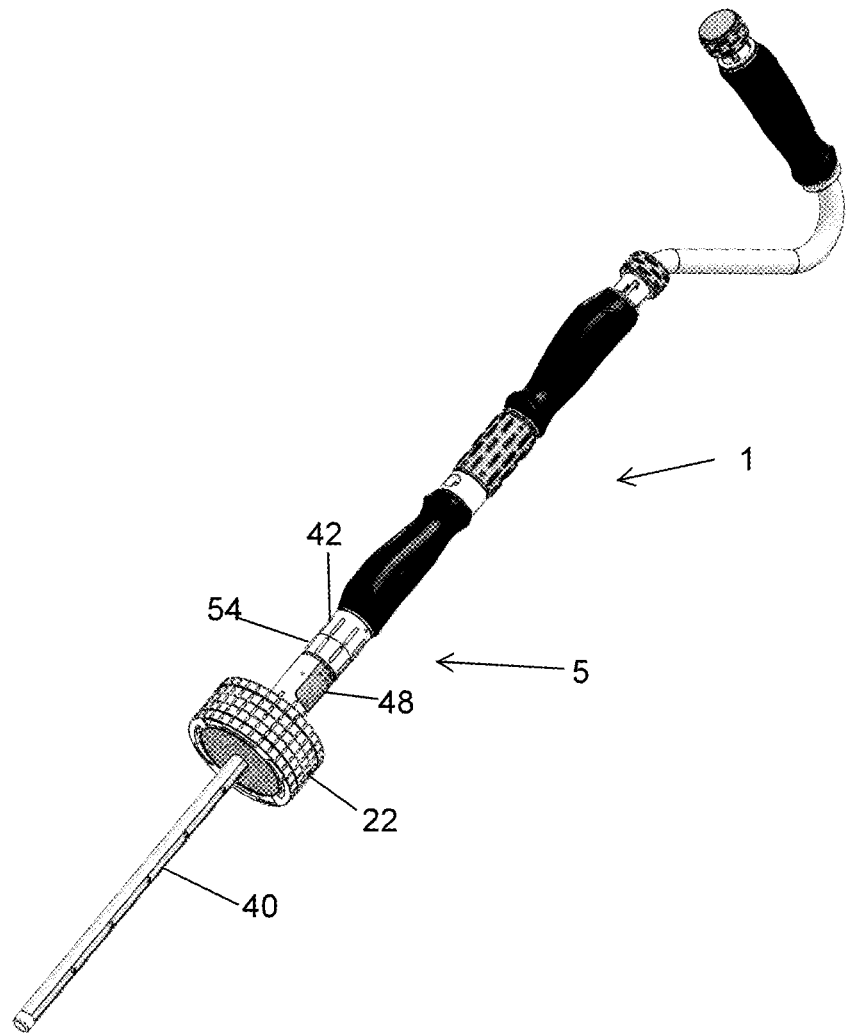
FIGS. 29 and 30 are perspective views showing different positions of the weight mounting carriage on the elongate shaft member.
Figure 30:
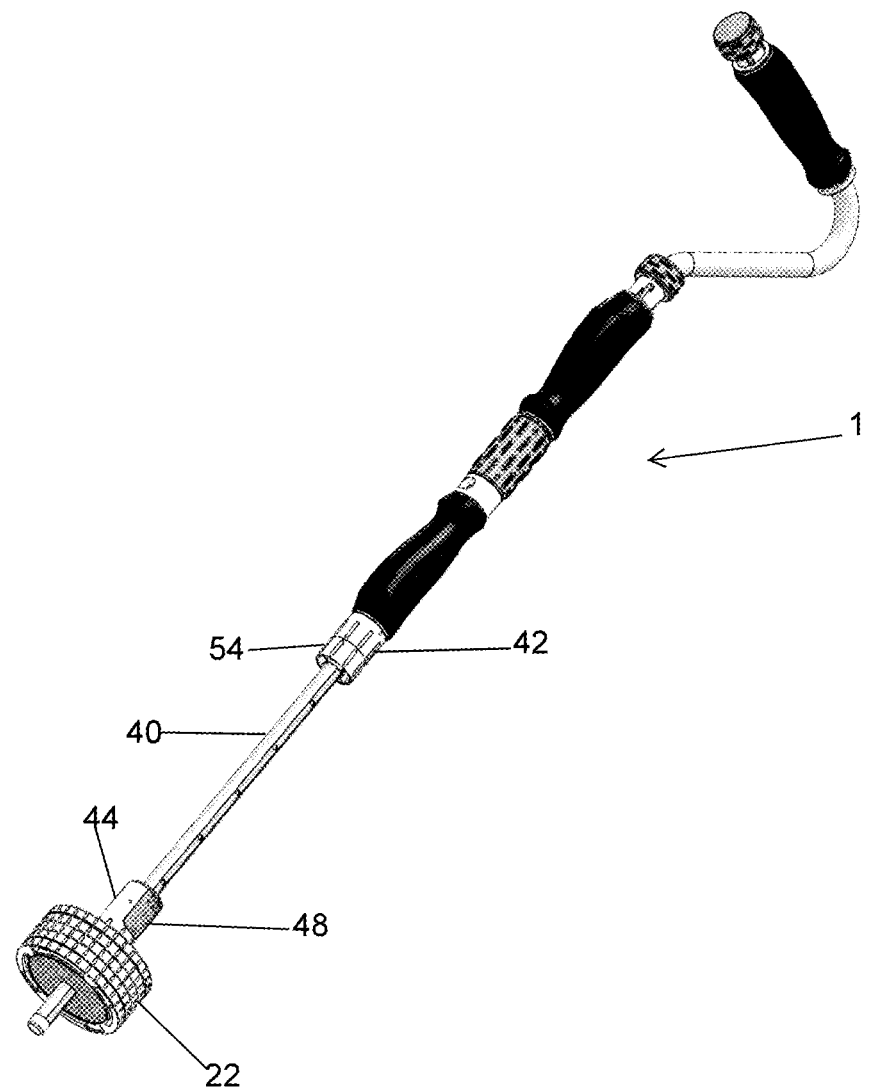

As shown in FIGS. 28 to 30, the weight carriage 44 complete with the desired weight load 22 may be positioned as required or as desired by sliding along and locking on the elongate shaft member 40 by appropriate manual actuation as described above.

FIGS. 31 to 34 show alternative configurations for using the exercise device according to the invention. As shown in FIG. 31, the exercise may be used without the attachment of the elongate shaft member 40 or the use of weights 2. As shown in FIG. 32, the exercise may be used without the attachment of the elongate shaft member 40 but with the use of weights 22 connected directly to the connector means 42 of the third section 5. As shown in FIG. 33, the exercise may be used with the attachment of the elongate shaft member 40 and the use of a slideably mounted and lockable weight carriage 44 mounting weights 22. As shown in FIG. 34, the exercise may also be used with the attachment of the elongate shaft member 40 and without weights 22 on a weight carriage 44 attached thereto.

It is to be understood that the invention is not limited to the specific details described herein which are given by way of example only and that various modifications and alternations are possible without departing from the scope of the invention as defined in the appended claims.

What is claimed is:

1. An exercise device comprising:
   a main body, and
   at least one rotatable hand grip on said main body,
   a mode selector for selecting between a first configuration, a second configuration and a third configuration, wherein in said first configuration said rotatable hand grip is rotatable relative to said main body, and wherein in said second configuration said rotatable hand grip is in a fixed position on said main body, and wherein in said third configuration said rotatable hand grip is rotatable relative to said main body with an adjustable resistance, and
   a resistance adjustment operable to impart said adjustable resistance on said rotatable hand grip in said third configuration, wherein said resistance adjustment includes a first compression spring operable between a first spring seat and a second spring seat that are a first distance apart within said main body, in which said first spring seat is slideably moveable within said main body to alter said first distance between said first spring seat and said second spring seat, therein adjusting said first compression spring and altering said resistance adjustment.

2. The exercise device as claimed in claim 1, wherein said resistance adjustment further comprises an adjustment actuator that is operable to adjust said first compression spring in said third configuration.

3. The exercise device as claimed in claim 1, wherein said resistance adjustment further includes a spring seat movement to independently move said first spring seat within said main body to adjust said first distance between said first spring seat and said second spring seat to adjust said first compression spring.

4. The exercise device as claimed in claim 1, wherein said spring seat movement includes a spring sleeve connected to said first spring seat and said adjustment actuator, and actuation of said adjustment actuator moves said spring sleeve and said first spring seat linearly along said main body toward and away from said second spring seat to said first compression spring for said third configuration.

5. The exercise device as claimed in claim 1, wherein said rotatable hand grip moves said second spring seat toward said first spring seat when said rotatable hand grip is rotated, therein compressing said first compression spring.

6. The exercise device as claimed in claim 1, wherein said resistance adjustment has a plurality of settings.

7. The exercise device as claimed in claim 1, wherein said main body comprises a first elongated section and a second elongated section, in which said first elongated section is arranged at an angle of between 45 degrees and 135 degrees to said second elongated section, wherein said first elongated section and said second elongated section are integrally formed.

8. The exercise device as claimed in claim 7, wherein said main body includes a third elongated section having a connector thereon for attaching weights to said third elongated section.

9. The exercise device as claimed in claim 1, wherein said main body includes a first elongated section and a second elongated section, in which said first elongated section is arranged at an angle of between 45 degrees and 135 degrees to said second elongated section, and a static handgrip is provided on said second elongated section of said exercise device.

10. The exercise device as claimed in claim 1, wherein said main body has a first elongated section, a second elongated section and a third elongated section, wherein said first elongated section is arranged at an angle of between 45 degrees and 135 degrees to said second elongated section, and wherein said third elongated section is operable telescopically from said second elongated section, and said third elongated section is configured to receive and retain added weights.

11. The exercise device as claimed in claim 1, wherein said main body includes a first elongated section and a second elongated section, in which said first elongated section is arranged at an angle of between 45 degrees and 135 degrees to said second elongated section, and in which said exercise device further comprises a third elongated section having a connector for optional attachment of weights.

12. The exercise device as claimed in claim 1, further including
a static grip provided on said main body in a fixed position, such that a user may hold said exercise device by said rotatable hand grip and by said static grip to perform exercises.

13. The exercise device as claimed in claim 1, further comprising a tensioner that imparts a rotational resistance to said rotatable hand grip as said rotational hand grip is rotated in said first configuration, wherein said tensioner includes a second compression spring positioned within said main body that compresses during rotation of said rotatable hand grip to resist rotation.

14. The exercise device as claimed in claim 13, wherein said main body is a substantially hollow shaft operable to house said tensioner.

15. The exercise device as claimed in claim 13, wherein said mode selector includes an actuator, wherein said actuator is selectively movable between a retracted position and an advanced position, wherein said exercise device further includes a fixed radial collar connected to said main body and a locking sleeve connected to said rotatable hand grip, and wherein said retracted position of said actuator enables said locking sleeve to disengage from said radial collar, therein enabling compression of said second compression spring and rotation of said rotatable hand grip about said main body, and wherein said advanced position of said actuator enables said locking sleeve to engage said radial collar to prevent rotation of said rotatable hand grip about said main body.

16. The exercise device as claimed in claim 1, wherein said rotatable hand grip can rotate in a range between 90 degrees and 180 degrees relative to said main body when in said first configuration.

17. The exercise device as claimed in claim 1, in which said exercise device further comprises a weight mounting carriage for retaining at least one weight.

18. The exercise device as claimed in claim 1, further including an elongated shaft member, a weight mounting carriage and weights, wherein said weights are slideably and releasably mounted to said elongated shaft member.

19. The exercise device as claimed in claim 18, wherein said elongated shaft member includes a plurality of spaced connection apertures and said weight mounting carriage is operable to connect to said elongated shaft member via said connection apertures, wherein said weight mounting carriage comprises an actuator operable to be toggled between a locked configuration and a moveable configuration, wherein when in said locked configuration, said weight mounting carriage is locked to said elongated shaft member via a connection aperture, and when in said moveable configuration, said weight mounting carriage is operable to slide along and be located in position on said elongated shaft member.

* * * * *